(12) United States Patent
Oh

(10) Patent No.: US 11,158,284 B2
(45) Date of Patent: Oct. 26, 2021

(54) ELECTRONIC APPARATUS AND CONTROL METHOD THEREOF

(71) Applicant: SAMSUNG ELECTRONICS CO., LTD., Suwon-si (KR)

(72) Inventor: Sungbo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/829,430

(22) Filed: Mar. 25, 2020

(65) Prior Publication Data
US 2020/0365112 A1 Nov. 19, 2020

(30) Foreign Application Priority Data

May 17, 2019 (KR) .................. 10-2019-0058244

(51) Int. Cl.
G09G 5/00 (2006.01)
H04N 21/4363 (2011.01)
H04N 21/4722 (2011.01)

(52) U.S. Cl.
CPC ....... *G09G 5/006* (2013.01); *H04N 21/43635* (2013.01); *H04N 21/4722* (2013.01); *G09G 2370/12* (2013.01)

(58) Field of Classification Search
CPC .............. G09G 5/006; G09G 2370/12; H04N 21/43635; H04N 21/4722;
(Continued)

(56) References Cited

U.S. PATENT DOCUMENTS

2008/0080596 A1 4/2008 Inoue et al.
2008/0288664 A1* 11/2008 Pettey ................. H04L 12/4633
710/5
(Continued)

FOREIGN PATENT DOCUMENTS

JP 2015-115670 A 6/2015
JP 2017-517047 A 6/2017
(Continued)

OTHER PUBLICATIONS

European Search Report and Written Opinion dated Sep. 22, 2020 in corresponding Application No. 20166837.3.
(Continued)

*Primary Examiner* — Farley Abad
(74) *Attorney, Agent, or Firm* — Nixon & Vanderhye P.C.

(57) ABSTRACT

An electronic apparatus includes: a signal output circuit configured to connect with an external apparatus connected to a display apparatus, a processor configured to control the electronic apparatus to: obtain information about a first image format supported in the display apparatus from the external apparatus, output a content signal having the first image format to the external apparatus through the signal output circuit to the display apparatus based on identifying that the external apparatus supports an interface protocol capable of transmitting the content signal having the first image format, and output a content signal having a second image format different from the first image format to the external apparatus through the signal output circuit based on identifying that the external apparatus does not support the interface protocol.

20 Claims, 16 Drawing Sheets

(58) Field of Classification Search
CPC ....... H04N 21/44227; H04N 21/43615; H04N 21/43632; H04N 21/43637; H04N 21/643; H04L 43/18
See application file for complete search history.

(56) References Cited

U.S. PATENT DOCUMENTS

| | | | |
|---|---|---|---|
| 2009/0077606 A1* | 3/2009 | Machida | G09G 5/006 725/118 |
| 2012/0033129 A1 | 2/2012 | Miura et al. | |
| 2016/0300595 A1 | 10/2016 | Jeon | |
| 2016/0378704 A1* | 12/2016 | Adamson | G06F 13/385 710/104 |
| 2017/0195722 A1* | 7/2017 | Seo | H04N 21/440263 |
| 2017/0236489 A1 | 8/2017 | Oh | |
| 2017/0238051 A1 | 8/2017 | Park et al. | |
| 2017/0331617 A1* | 11/2017 | Nee | H04L 7/0091 |
| 2018/0054589 A1 | 2/2018 | Park | |
| 2018/0176505 A1 | 6/2018 | Byun et al. | |
| 2018/0288106 A1* | 10/2018 | Ranade | H04N 21/43635 |
| 2018/0310055 A1 | 10/2018 | Seo et al. | |

FOREIGN PATENT DOCUMENTS

| | | |
|---|---|---|
| JP | 2018-514847 A | 6/2018 |
| KR | 10-1369390 | 3/2014 |
| KR | 10-2016-0122027 | 10/2016 |

OTHER PUBLICATIONS

Kendall, "Essentials of HDMI 2.1 Protocols for 48Gbps Transmission" Essentials of HDMI 2.1 Protocols for 48Gbps Transmission, Dec. 19, 2017 (Dec. 19, 2017), pp. 1-75, XP055729362.

Anonymous, "HDMI 2.1 vs HDMI 2.0 Spezifikationen, Unterschiede", Apr. 7, 2019 (Apr. 7, 2019), XP055729541.

International Search Report and Written Opinion dated Jul. 14, 2020 in counterpart International Patent Application No. PCT/KR2020/004222.

Japanese Office Action dated May 25, 2021 for JP Application No. 2020-068136.

* cited by examiner

FIG. 8

| Offset | Bit 7 | Bit 6 | Bit 5 | Bit 4 | Bit 3 | Bit 2 | Bit 1 | Bit 0 |
|---|---|---|---|---|---|---|---|---|
| 0x10 | Rsvd (0) | RSED_Update | FLT_update | FRL_start | Source_Test_Update | RIR_Test | CED_Update | Status_Update |
| 0x11 | Rsvd (0) | Rsvd (0) | Rsvd (0) | Rsvd (0) | Rsvd (0) | Rsvd (0) | Rsvd (0) | Rsvd (0) |

FIG. 10

| Offset | Bit 7 | Bit 6 | Bit 5 | Bit 4 | Bit 3 | Bit 2 | Bit 1 | Bit 0 |
|---|---|---|---|---|---|---|---|---|
| 0x35 | FRL_Max | DSC_FRL_Max | FLT_no_timeout | Rsvd (0) | TxFFE_No_FFE | TxFFE_De_Emphasis_Only | TxFFE_Shoot_Only | Rsvd (0) |

| Offset | Bit 7 | Bit 6 | Bit 5 | Bit 4 | Bit 3 | Bit 2 | Bit 1 | Bit 0 |
|---|---|---|---|---|---|---|---|---|
| 0x40 | DSC_DecodeFail | FLT_ready | Rsvd (0) | Lane3_Locked | Ch2_Ln2_Locked | Ch1_Ln1_Locked | Ch0_Ln0_Locked | Clock_Detected |
| 0x41 | Ln1_LTP_req | | | | | | Ln0_LTP_req | |
| 0x42 | Ln3_LTP_req | | | | | | Ln2_LTP_req | |

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0058244, filed on May 17, 2019, in the Korean Intellectual Property Office, the disclosure of which is incorporated by reference herein in its entirety.

BACKGROUND

Field

The disclosure relates to an electronic apparatus providing an image content signal to a display apparatus via an intermediate apparatus and a control method thereof, and for example to an electronic apparatus which considers transmission protocols of image content respectively supported by an intermediate apparatus and an display apparatus with respect to image content having an ultra-high definition (UHD) resolution higher than or equal to 8K and identifies image quality of image content to be output to an intermediate apparatus, and a method of controlling the same.

Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus may be classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied by a display apparatus that displays an image based on processed image data on its own display panel, and may for example include a television (TV), a monitor, a portable multimedia player, a tablet PC, a mobile phone, etc.

Further, among the electronic apparatuses, there is an apparatus that provides image data to another image processing apparatus such as a TV, and such an apparatus may for example include an ultra-high definition (UHD) player, etc. For example, image content reproduced in the UHD player is provided to the TV according to preset interface protocols, and the TV displays an image based on the image content.

The electronic apparatus for providing image content may be directly connected to the display apparatus and provide the image content without using a separate apparatus. However, due to various environmental causes or convenience in use, etc., it may be structured that image content is primarily transmitted from an image-content providing apparatus to a predetermined intermediate or relaying apparatus and secondarily transmitted from the intermediate apparatus to the display apparatus. The intermediate apparatus may not only simply transmit the image content but also apply various processes to the image content and then transmit the processed image content to the display apparatus. As an example of such processes, there are authentication, scrambling, descrambling, etc. for the security of the image content.

To display an image with the best quality on the display apparatus, the electronic apparatus needs to output image content having the highest image quality supportable in the display apparatus. However, when there is a mismatch in performance of processing image content between the intermediate apparatus and the display apparatus, the image content may be abnormally transmitted or may not be transmitted at all from the intermediate apparatus to the display apparatus.

For example, the UHD player or the like source apparatus and the TV may support a process for an 8K image, whereas the intermediate apparatus may support a process for a 4K image. The intermediate apparatus transmits extended display identification data (EDID) received from the TV to the source apparatus, and the source apparatus outputs a video signal having an image quality of 8K to the intermediate apparatus based on the received EDID of the TV. In this case, the intermediate apparatus cannot normally process the video signal having the image quality of 8K received from the source apparatus because the process support is possible up to 4K. Therefore, the video signal is blocked in the stage of the intermediate apparatus, and thus the TV displays no images.

Accordingly, it is important to address the mismatching and guarantee that the display apparatus normally display image content.

SUMMARY

Embodiments of the disclosure provide a method and apparatus addressing mismatching so that a display apparatus may normally display image content.

According to an example embodiment of the disclosure of the present disclosure, an electronic apparatus is provided, the electronic apparatus including: a signal output circuit configured to connect with an external apparatus connected to a display apparatus, a processor configured to control the electronic apparatus to: obtain information about a first image format supported in the display apparatus from the external apparatus, output a content signal having the first image format to the external apparatus through the signal output circuit to the display apparatus based on identifying that the external apparatus supports an interface protocol capable of transmitting the content signal having the first image format, and output a content signal having a second image format different from the first image format to the external apparatus through the signal output circuit based on identifying that the external apparatus does not support the interface protocol.

The processor may be configured to identify that the external apparatus does not support the interface protocol based on a predetermined signal line between the signal output circuit and the external apparatus being used in transmitting a clock signal and not data of a content signal, and identify that the external apparatus supports the interface protocol based on the signal line being used in transmitting the data.

The interface protocol may be supported based on connection using a high definition multimedia interface (HDMI) 2.1 and the following HDMI between the signal output circuit and the external apparatus, but the interface protocol may not be supported based on connection using a previous HDMI older than the HDMI 2.1.

A value stored in a preset register of the external apparatus may be checked to identify whether the interface protocol is supported.

The processor may control the electronic apparatus to output the content signal having the first image format based on identifying that the external apparatus supports a mode of decompressing and processing image data compressed and transmitted in real time.

The information obtained from the external apparatus may be divided into a plurality of blocks, and the processor may control the electronic apparatus to output the content signal having the first image format based on identifying that the number of blocks, among the plurality of blocks is greater than or equal to a threshold, wherein the number of blocks is not null.

The information may include extended display identification data (EDID), the processor may control the electronic apparatus to output the content signal having the first image format based on identifying that three or more blocks, which are not null, are present in the EDID.

The processor may be configured to control the electronic apparatus to output the content signal having the first image format based on identifying that the external apparatus supports a power transfer mode to the external apparatus through the signal output circuit.

The processor may be configured to control the electronic apparatus to: output the content signal having the first image format based on identifying that the external apparatus supports a mode of extracting an audio signal from the content signal received from the electronic apparatus and returning the extracted audio signal to the electronic apparatus.

The first image format may correspond to an 8K-class resolution, and the second image format may correspond to a resolution lower than the 8K-class resolution.

The signal output circuit may be configured to output the content signal based on a high definition multimedia interface (HDMI) protocol.

According to another example embodiment of the disclosure of the present disclosure, a method of controlling an electronic apparatus is provided, the method including: obtaining information about a first image format supported in a display apparatus from an external apparatus connected to the display apparatus; outputting a content signal having the first image format to the external apparatus to the display apparatus based on identifying that the external apparatus supports an interface protocol capable of transmitting the content signal having the first image format; and outputting a content signal having a second image format different from the first image format to the external apparatus based on identifying that the external apparatus does not support the interface protocol.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8 is a diagram illustrating fields of status and control data channel (SCDC) update flags prescribed in the HDMI 2.1;

FIG. 10 is a diagram illustrating fields of status flags and a SCDC source test configuration prescribed in the HDMI 2.1;

DETAILED DESCRIPTION

Below, various example embodiments will be described in greater detail with reference to accompanying drawings. Further, the example embodiments described with reference to the accompanying drawings are not exclusive to each other unless otherwise mentioned, and a plurality of embodiments may be selectively combined within one apparatus.

The combination of these plural embodiments may be discretionally selected and applied by a person having an ordinary skill in the art.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
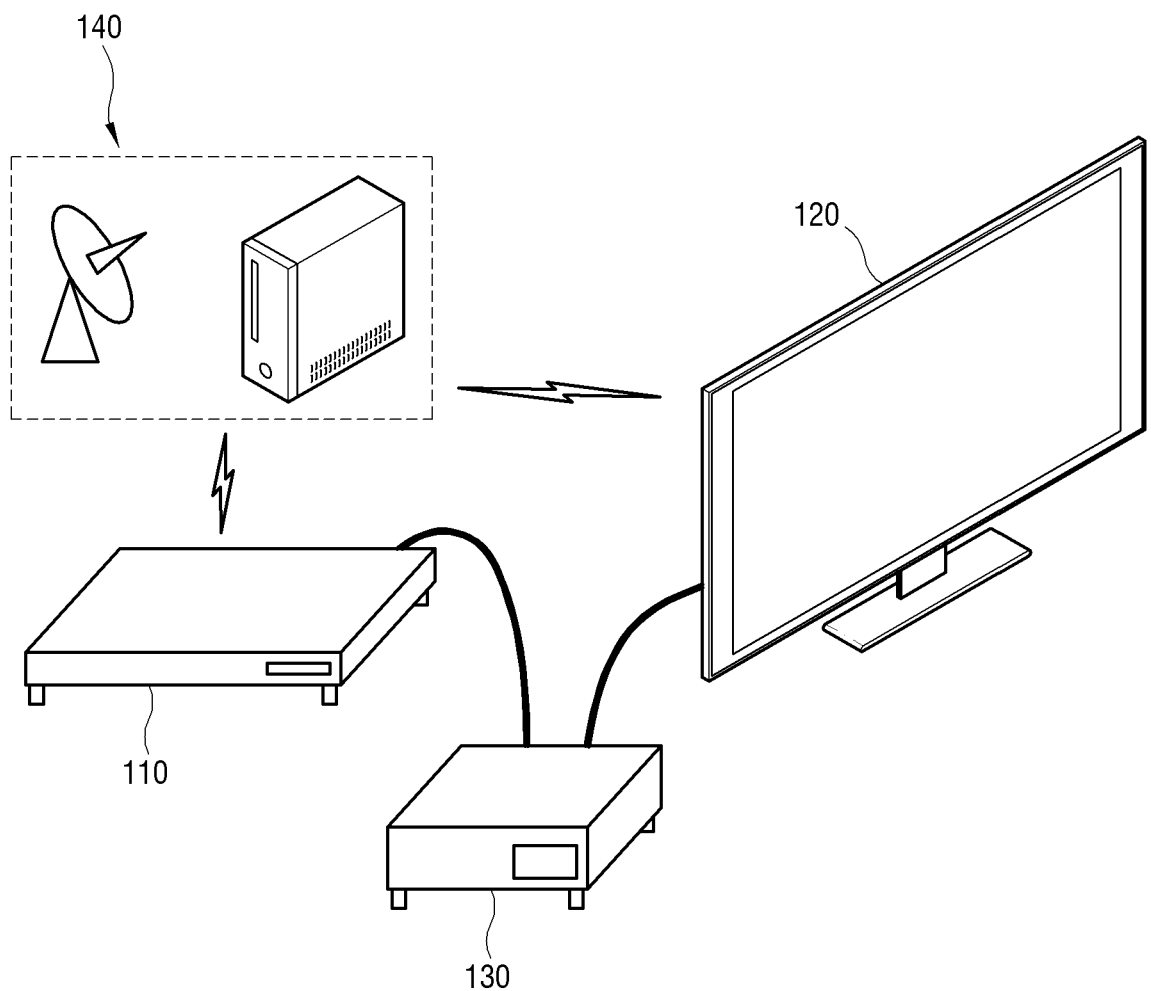
FIG. 1 is a diagram illustrating an example system including a plurality of apparatuses connected in series according to an embodiment of the disclosure.

FIG. 1 is a diagram illustrating an example system including a plurality of apparatuses connected in series according to an embodiment of the disclosure.

As shown in FIG. 1, the system includes the plurality of electronic apparatuses 110, 120 and 130. According to functions performed in the system, the electronic apparatuses 110, 120 and 130 include a first apparatus 110 which outputs a video signal containing image content, a second apparatus 120 which displays an image by processing the video signal output from the first apparatus 110, and a third apparatus 130 which relays the video signal output from the first apparatus 110 to the second apparatus 120 in between the first apparatus 110 and the second apparatus 120.

The first apparatus 110 and the second apparatus 120 may each be connected to the third apparatus 130 through cables, and therefore the video signal may be transmitted from the first apparatus 110 to the third apparatus 130 and from the third apparatus 130 to the second apparatus 120 through the cables. The first apparatus 110, the second apparatus 120 and the third apparatus 130 are configured to support interface protocols for signal transmission therebetween, so that the video signal provided by the first apparatus 110 can be processed by the second apparatus 120.

The first apparatus 110 may reproduce image content stored therein or receive image content from an external image source 140. The first apparatus 110 may for example be embodied in various forms, such as, for example, and without limitation, a player for a digital versatile disc (DVD), Blu-ray or the like optical media, an ultra-high definition (UHD) player, a set-top box, a television (TV), a computer main body, a mobile apparatus, a home theater, a game console, a content server, etc.

The second apparatus 120 may be embodied in various forms, such as, for example, and without limitation, not only a TV but also a monitor, a portable multimedia player, a mobile phone, a table personal computer, an electronic frame, a digital whiteboard, an electronic billboard, etc. In an example embodiment, the second apparatus 120 is provided as a TV or the like display apparatus which receives image content from the first apparatus 110 and displays an image. However, the second apparatus 120 is not limited thereto, and may be provided as an image processing apparatus which cannot autonomously display an image.

The second apparatus 120 does not necessarily receive image content from only the first apparatus 110, but may receive image content from a separate image source 140. Further, the second apparatus 120 may be connected to the first apparatus 110 without relaying of the third apparatus 130, and may directly receive a video signal from the first apparatus 110. Further, the video signal is not necessarily transmitted through only the cable, and may be transmitted in various ways besides the cable. However, for convenience and ease of description, an example embodiment will be described focusing on a case that the second apparatus 120 receives image content from the first apparatus via the relaying of the third apparatus 130.

The third apparatus 130 may, for example, and without limitation, be embodied by an intermediate apparatus, a relaying apparatus, an audio/video receiver, a repeater, a home theater, a converter, a relay, or the like, which relays a signal of image content from the first apparatus 110 to the second apparatus 120. In this process, the third apparatus 130 may process the signal based on a predetermined process. For example, the first apparatus 110, the third apparatus 130 and the second apparatus 120 may be connected in series. For example, the content signal output from the first apparatus 110 may be transmitted to the second apparatus 120 via the third apparatus 130. On the other hand, information about the function, performance or capability of the second apparatus 120, which may be stored in the second apparatus 120, may be transmitted from the second apparatus 120 to the first apparatus 110 via the third apparatus 130. As an example of such information, there is extended display identification data (EDID). The EDID shows the characteristics of the electronic apparatus, e.g., device information, which may include, for example, and without limitation, the image quality, image format, transmission interface protocol, etc. supportable in the electronic apparatus. The EDID may be embedded in the electronic apparatus.

Below, an example configuration of the first apparatus 110 will be described with reference to FIG. 2. For convenience, the first apparatus 110 will be referred to as a source apparatus in terms of providing image content, and the second apparatus 120 will be referred to as a sink apparatus in terms of receiving image content.

Figure 2:
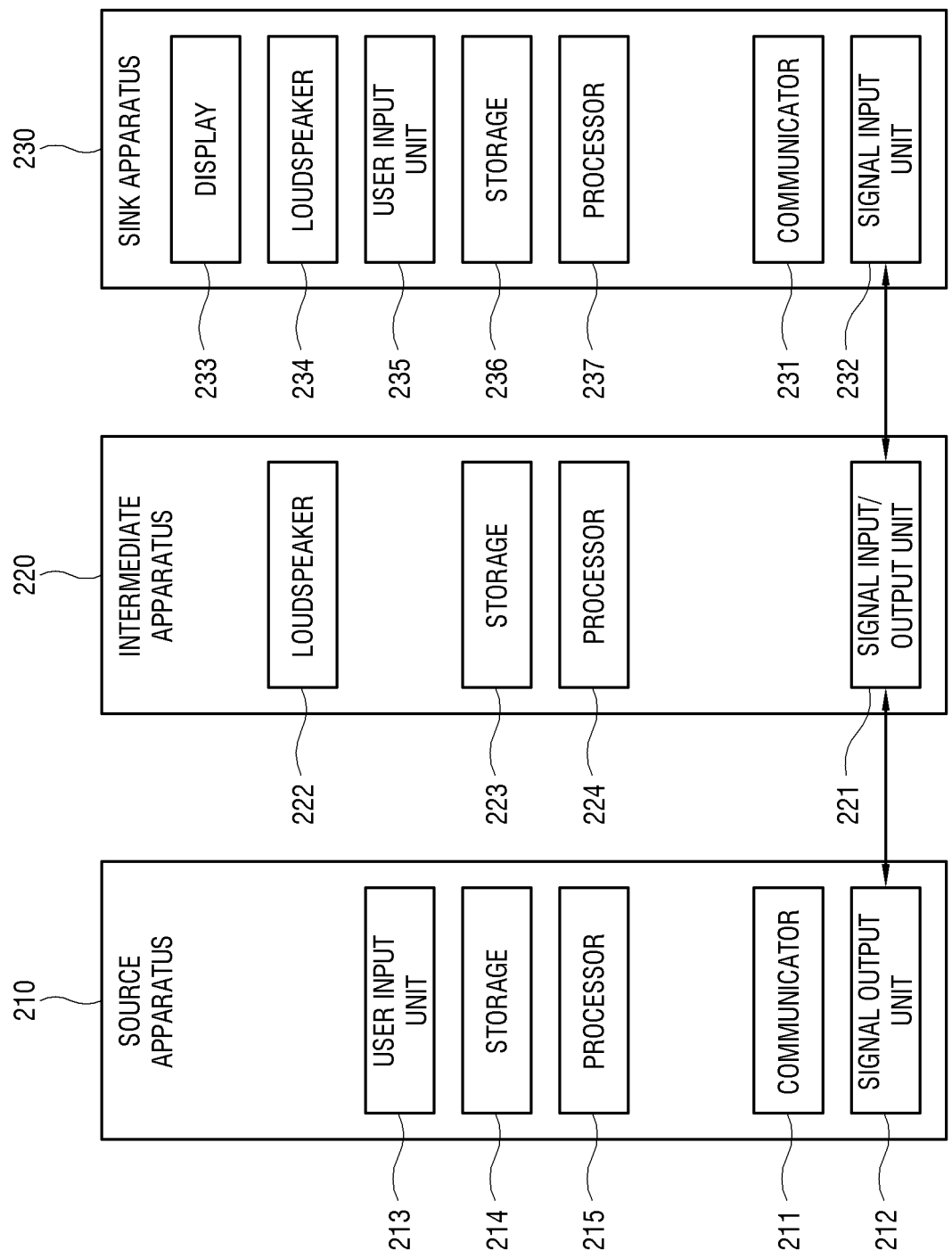
FIG. 2 is a block diagram illustrating an example source apparatus, intermediate apparatus and sink apparatus according to an embodiment of the disclosure.

FIG. 2 is a block diagram illustrating an example source apparatus, intermediate apparatus and sink apparatus according to an embodiment of the disclosure.

As shown in FIG. 2, a source apparatus 210 may include, for example, a communicator (e.g., including communication circuitry) 211, a signal output unit (e.g., including signal output circuitry) 212, a user input unit (e.g., including input circuitry) 213, a storage 214, and a processor (e.g., including processing circuitry) 215. An intermediate apparatus 220 may include, for example, a signal input/output unit (e.g., including signal input/output circuitry) 221, a loudspeaker 222, a storage 223, and a processor (e.g., including processing circuitry) 224. A sink apparatus 230 may include, for example, a communicator (e.g., including communication circuitry) 231, a signal input unit (e.g., including signal input circuitry) 232, a display 233, a loudspeaker 234, a user input unit (e.g., including input circuitry) 235, a storage 236, and a processor (e.g., including processing circuitry) 237.

In an example embodiment, it will be described that the intermediate apparatus 220 includes the loudspeaker 222 and the storage 223. However, the intermediate apparatus 220 may not include the loudspeaker 222 and the storage 223.

Below, the elements of the source apparatus 210 will be described. In view of a typical electronic apparatus, the elements of the intermediate apparatus 220 and the sink apparatus 230 will be also analogized with reference to the elements of the source apparatus 210, and thus repeated descriptions thereof will be avoided as necessary.

The communicator 211 may include various communication circuitry and may refer, for example, to an interactive communication circuit that includes at least one of elements including various processing circuitry, such as, for example, and without limitation, a communication module, a communication chip, etc. corresponding to various wired and wireless communication protocols. The communicator 211 may for example, and without limitation, include a Wi-Fi communication chip for performing Wi-Fi communication through an access point, a Bluetooth low energy (BLE) communication chip for performing BLE communication, a local area network (LAN) card connected to a router or a gateway, and the like elements for performing communication based on one or more communication protocols.

The signal output unit 212 may include various signal output circuitry and may transmit a content signal processed by the processor 215 to the intermediate apparatus 220. In this example, the signal output unit 212 may perform serializing or the like additional process for signal transmission separately from the processor 215, or may be designed to perform a process based on a specific protocol instead of the processor 215. The processor 215 may include various processing circuitry and serve to not only transmit a content signal to the intermediate apparatus 220 but also receive a control signal or the like from the intermediate apparatus 220. The signal output unit 212 may serve as a communication interface for exchanging a signal with various external apparatuses (not shown) besides the intermediate apparatus 220. In an example embodiment, the signal output unit 212 is provided to transmit and receive a signal based, for example, and without limitation, on a protocol of a high definition multimedia interface (HDMI). However, the HDMI is merely one of various examples for the signal output unit 212. The signal output unit 212 may be designed to reflect various protocols such as, for example, and without limitation, DisplayPort (DP), Thunderbolt, mobile high-definition link (MHL), universal serial bus (USB), etc.

The user input unit 213 may include various input circuitry and may include a circuit related to various input interfaces provided to be controlled by a user to make an input. The user input unit 213 may be variously configured according to the kinds of source apparatus 210, and may include, for example, and without limitation, a mechanical or electronic button of the source apparatus 210, a remote controller separated from the main body of the source apparatus 210, a touch pad, a touch screen, etc.

The storage 214 may be accessed by the processor 215, and may perform operations such as reading, recording, modifying, deleting, updating, etc. for data under control of the processor 215. The storage 214 may include a flash memory, a hard disk drive (HDD), a solid state drive (SSD), a read only memory (ROM), and the like nonvolatile memory in which data is retained regardless of whether power is supplied or not; and a buffer, a random access memory (RAM) and the like volatile memory to which processing data is loaded. Further, the storage 214 may be configured to read image content from a Blu-ray disc or the like optical medium.

The processor 215 may include various processing circuitry including one or more hardware processors achieved, for example, and without limitation, by a central processing unit (CPU), a dedicated processor, a chipset, a buffer, a circuit, etc. which may be mounted on a printed circuit board (PCB). The processor 215 may be designed as a system on chip (SoC). The processor 215 may include, for example, modules corresponding to various processes, such as, for example, and without limitation, a demultiplexer, a decoder, a scaler, an audio digital signal processor (DSP), an amplifier, etc. for image processing. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 215 may process image content stored in the storage 214 or received from the outside in accordance with a preset process. When the source apparatus 210 is, for example, a UHD Blu-ray player, the processor 215 may perform various processes, such as, for example, and without limitation, packaging, scrambling, etc. according to preset multimedia interface protocols so that a content signal can be output through the signal output unit 212.

With this structure, the source apparatus 210 may output a content signal, including a video signal and an audio signal to the intermediate apparatus 220. The intermediate apparatus 220 processes the content signal and outputs the processed content signal to the sink apparatus 230. The sink apparatus 230 may display an image on the display 233 based on the video signal of the content signal. In this example, the intermediate apparatus 220 may transmit the whole processed content signal to the sink apparatus 230, so that the audio signal of the content signal can be output to the loudspeaker 234 of the sink apparatus 230. The intermediate apparatus 220 may output an audio signal through its own loudspeaker 222 while transmitting the video signal to the sink apparatus 230 so that the display 233 can display an image.

Below, it will be described that the source apparatus 210 identifies image quality of image content to be output, based on the EDID of the sink apparatus 230, which is received from the intermediate apparatus 220.

Figure 3:
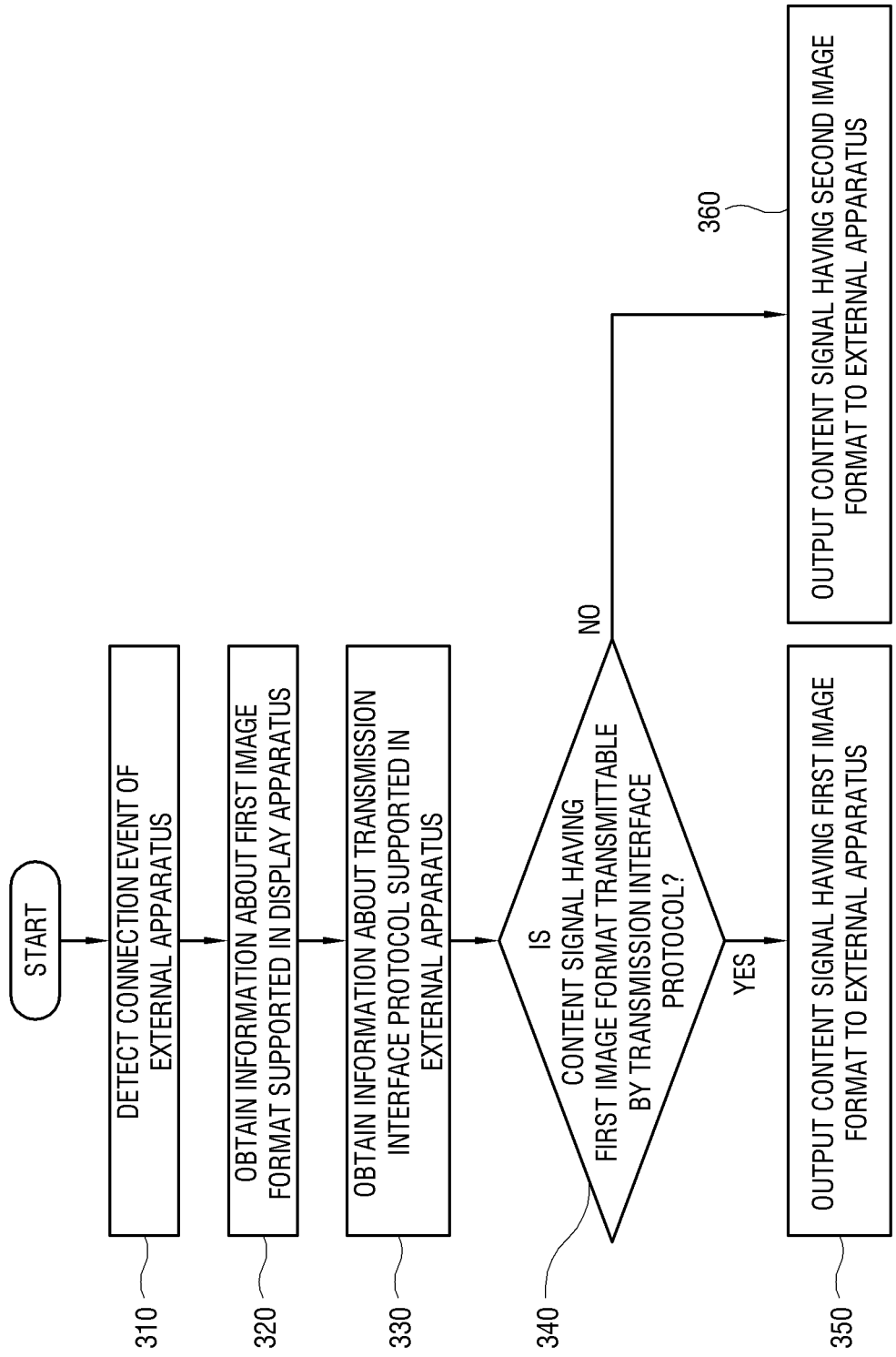
FIG. 3 is a flowchart illustrating an example method of identifying image quality of image content output from an electronic apparatus according to an embodiment of the disclosure.

FIG. 3 is a flowchart illustrating an example method of identifying image quality of image content output from an electronic apparatus according to an embodiment of the disclosure.

As shown in FIG. 3, the following operations may be performed by the processor of the electronic apparatus. In these operations, the electronic apparatus may correspond to the source apparatus, the external apparatus may correspond to the intermediate apparatus, and the display apparatus may correspond to the sink apparatus. However, the specific functions are not limited by the titles of the apparatuses.

At operation 310 the electronic apparatus may detect a connection event of the external apparatus. This event may for example occur when the external apparatus is connected for communication to the signal output unit through a cable.

At operation 320 the electronic apparatus may obtain information about a first image format, which is supported in the display apparatus, from the external apparatus in response to the event detection. The external apparatus obtains this information from the display apparatus and transmits the obtained information to the electronic apparatus.

At operation 330 the electronic apparatus obtains information about a transmission interface protocol, which is supported in the external apparatus, from the external apparatus.

At operation 340 the electronic apparatus identifies whether the content signal having the first image format is transmittable by a transmission interface protocol supported in the external apparatus, based on the information about the transmission interface protocol. The identification method may be variously embodied, and this will be described later.

When it is identified that the content signal having the first image format is transmittable by the transmission interface protocol ("Yes" at operation 340), at operation 350 the electronic apparatus may output the content signal having the first image format to the external apparatus. Thus, the external apparatus transmits the content signal having the first image format to the display apparatus, and the display apparatus displays an image having the first format by processing the content signal.

On the other hand, when it is identified that the content signal having the first image format is not transmittable by the transmission interface protocol ("No" at operation 340), at operation 360 the electronic apparatus may output the content signal having a second image format different from the first image format to the external apparatus. Thus, the external apparatus transmits the content signal having the second image format received from the electronic apparatus to the display apparatus, and the display apparatus processes the content signal and displays the image having the second image format.

In this example, the second image format may be selected as an image format, transmittable by the transmission interface protocol supported in the external apparatus, among the plurality of image formats displayable by the display apparatus.

Details of the operation 360 include, when the electronic apparatus outputs the content signal having the first image format to the external apparatus even though the content signal having the first image format is not transmittable by the transmission interface protocol supported in the external apparatus, the external apparatus cannot normally receive and process the content signal having the first image format. Thus, the electronic apparatus outputs the content signal having the second image format different from the first image format to the external apparatus. For example, the second image format may be an image format having a lower resolution than the first image format. The second image format is not limited to the format which merely has a lower resolution than the first image format, but may include an image format which has or lacks various additional image properties such as, for example, and without limitation, brightness, sharpness, and the like lower than those of the first image format.

Because the electronic apparatus normally transmits the content signal to the display apparatus through the external apparatus, it is possible to at least prevent and/or avoid the display apparatus from displaying no images.

Operations of the foregoing example embodiment may be represented as follows. When the external apparatus receives the EDID of the display apparatus from the display apparatus, the external apparatus may relay the whole or a part of the EDID to the electronic apparatus. The electronic apparatus may identify whether the EDID received from the external apparatus is reliable. When the electronic apparatus identifies that the received EDID is reliable, the electronic apparatus identifies that the external apparatus supports the first image format based on information contained in the EDID and outputs the content signal in the first image format.

On the other hand, when the electronic apparatus identifies that the received EDID is not reliable, the electronic apparatus does not output the content signal in the first image format even though the information contained in the received EDID shows that the first image format is supported. Instead, the electronic apparatus identifies the second image format supported in the external apparatus separately from the received EDID of the display apparatus, and outputs the content signal to the second image format.

Two factors emerging from the foregoing operation, e.g., the image format and the transmission interface protocol may be related to each other as follows.

The image format shows various properties of an image corresponding to a content signal. For example, the image format may include, without limitation, codec information for encoding/decoding a raw image, the image quality of the image, the resolution of the image, etc. Below, in an example embodiment, it will be described that the image format is related to the resolution, but the image format may be embodied by other properties.

The resolution may refer, for example, to a value that represents a total number of pixels forming one frame of an image in the form of M*N (where, M and N are natural numbers and "*" is a multiplication sign). Because a higher resolution shows more pixels in one frame, the amount of data per frame increases. Further, a large amount of data per frame requires a high level of transmission quantity per unit time, and therefore a content signal having an image format corresponding to a high resolution may not be normally transmitted by the transmission interface protocol prescribed before the image format is published.

There have been various proposed resolutions. In general, the resolutions are based on an aspect ratio of 16:9. As representative resolutions, there are high definition (HD, 1280*720), full high definition (FHD, 1920*1080), 4K or ultra-high definition (UHD, 3840*2160), 8K or ultra-full high definition (FUHD, 7680*4320), 16K or quad ultra-high definition (QUHD, 15360*8640), etc. The higher, the resolution, the more massive the data to be transmitted for a content signal.

An example embodiment will be described under the condition that the transmission interface protocol is the HDMI, for convenience and ease of description. However, the HDMI is merely an example, and the concept of the disclosure may be applied to various protocols, divided into a higher edition and a lower edition according to versions, such as, for example, and without limitation, DP, Thunderbolt, etc. besides the HDMI.

The HDMI protocol has hitherto been published as a version 2.1. The HDMI 2.1 is provided to transmit a content signal having a higher resolution than the previous HDMI, for example, an 8K-class content signal. It may be difficult for the previous HDMI older than the HDMI 2.1 to normally transmit the 8K-class content signal in various terms of a data transmission rate, a bandwidth, etc. The HDMI 2.0 can transmit an 8K 30 Hz content signal, but cannot normally transmit an 8K content signal at frames per seconds exceeding 30 Hz, for example, an 8K 60 Hz content signal.

When the electronic apparatus outputs an 8K content signal at frames per seconds exceeding 30 Hz to the external apparatus so that the display apparatus can display an 8K content image, the external apparatus as well as the display apparatus needs to support the HDMI 2.1 by which an 8K content signal can be transmitted and received. For example, when the first image format mentioned in the above operation is the 8K-class, the external apparatus needs to support the HDMI 2.1 or higher to transmit and receive the content signal.

Below, HDMI 2.1 will be schematically described.

Figure 4:
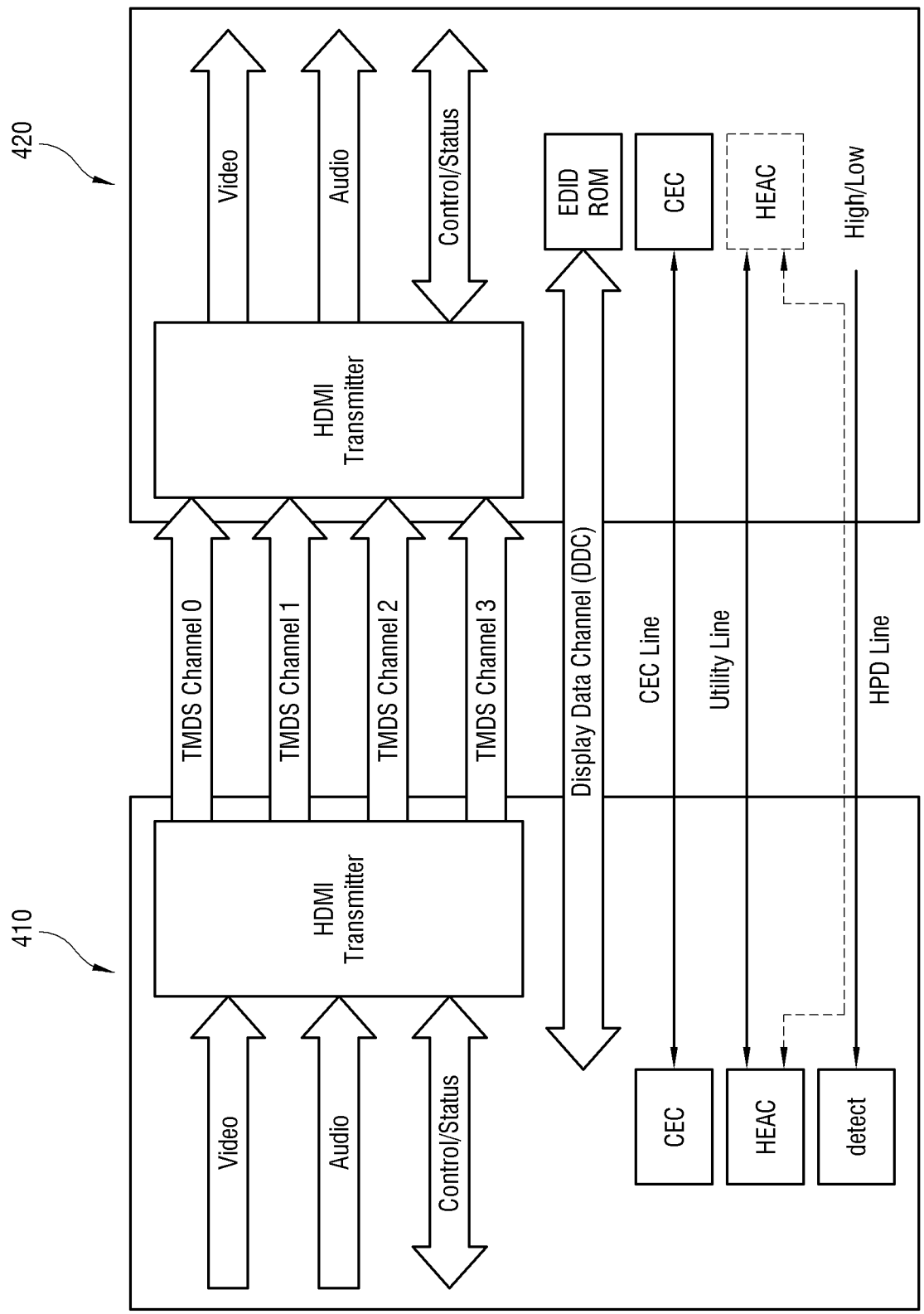
FIG. 4 is a block diagram illustrating a protocol of high definition multimedia interface (HDMI) 2.1 applied to signal transmission between Tx and Rx according to an embodiment of the disclosure.

FIG. 4 is a block diagram illustrating an example protocol of high definition multimedia interface (HDMI) 2.1 applied to signal transmission between Tx and Rx according to an embodiment of the disclosure;

As shown in FIG. 4, it will be assumed that transition minimized differential signaling (TMDS) transmission from a Tx 410 to an Rx 420 is performed through an HDMI cable according to HDMI 2.1. The Tx 410 may, for example, be regarded as a source apparatus for transmitting a content signal, and the Rx 420 may, for example, be regarded as an intermediate apparatus for receiving the content signal.

According to the HDMI, the TMDS is used in a physical layer, high-bandwidth digital content protection (HDCP) is used to encrypt a signal for content security, EDID is used for authentication between devices, and consumer electronics control (CEC) is used in control connection for the whole system.

The HDMI cable and connectors include four differential pairs corresponding to four channels to transmit TMDS data. Such channels are used to transmit image data, audio data, and auxiliary data.

Further, the HDMI includes an I2C-based communication channel, e.g., a video electronic standards association (VESA) display data channel (DDC), and the DDC is used to exchange configuration and status information between the Tx 410 and the Rx 420. An additional CEC protocol provides high-level control functions between various AV products in the system. An additional HDMI Ethernet and audio return channel (HEAC) provides Ethernet compatible data networking between connected apparatuses and an audio return channel in the opposite direction from the TMDS.

The DDC may be used for the Tx 410 to identify the performance and characteristic of the Rx 420. The Tx 410 obtains the EDID recorded in the EDID read only memory (ROM) of the Rx 420 through the DDC and identifies a performance level of the Rx 420 based on the information of the obtained EDID.

The CEC connects all the Tx 410 and the Rx 420 in the system with one control line. The DDC is formed by one to one between the Tx 410 and the Rx 420, but the CEC connects all the apparatuses in the system and is for example used to control all the apparatuses through one remote controller.

The HDMI 2.1 has a similar basic specification to but some distinctions from the previous HDMI. The HDMI 2.1 provides a transmission bandwidth of 48 Gbps, which is 2.5 times higher than the transmission bandwidth of 18 Gbps provided by the HDMI 2.0. According to the HDMI 2.1, it is possible to transmit 4K content up to 144 Hz and 8K content up to 30 Hz without compression even though high data rate (HDR) content encoded with 10-bit color is given.

Further, the HDMI 2.1 employs four data channels to perform TMDS transmission, and does not have a clock channel for separately transmitting a clock signal. In the HDMI 2.1, the clock signal is transmitted as it is not separated from the data but embedded in the data. On the other hand, the previous HDMI older than the HDMI 2.1 employs three channels among four channels as the data channels, and one channel as a clock channel. That is, a TMDS channel 3 used as the data channel in the HDMI 2.1 is used as not the data channel but the clock channel in the previous HDMI older than the HDMI 2.1.

For this reason, the HDMI 2.1 can cope with transmission of an 8K-class content signal. While the previous HDMI older than the HDMI 2.1 performs the TMDS transmission through three data channels, the HDMI 2.1 performs the TMDS transmission through four data channels. Therefore, the HDMI 2.1 has a data transmission rate much higher than that of the previous HDMI.

There are many methods of identifying whether the content signal having the first image format is transmittable by a transmission interface protocol between the source apparatus and the intermediate apparatus, for example, whether the intermediate apparatus supports the HDMI 2.1 capable of transmitting the 8K-class content signal. These methods will be described later.

Below, an example that the EDID of the sink apparatus is transmitted to the source apparatus via the intermediate apparatus will be described.

Figure 5:
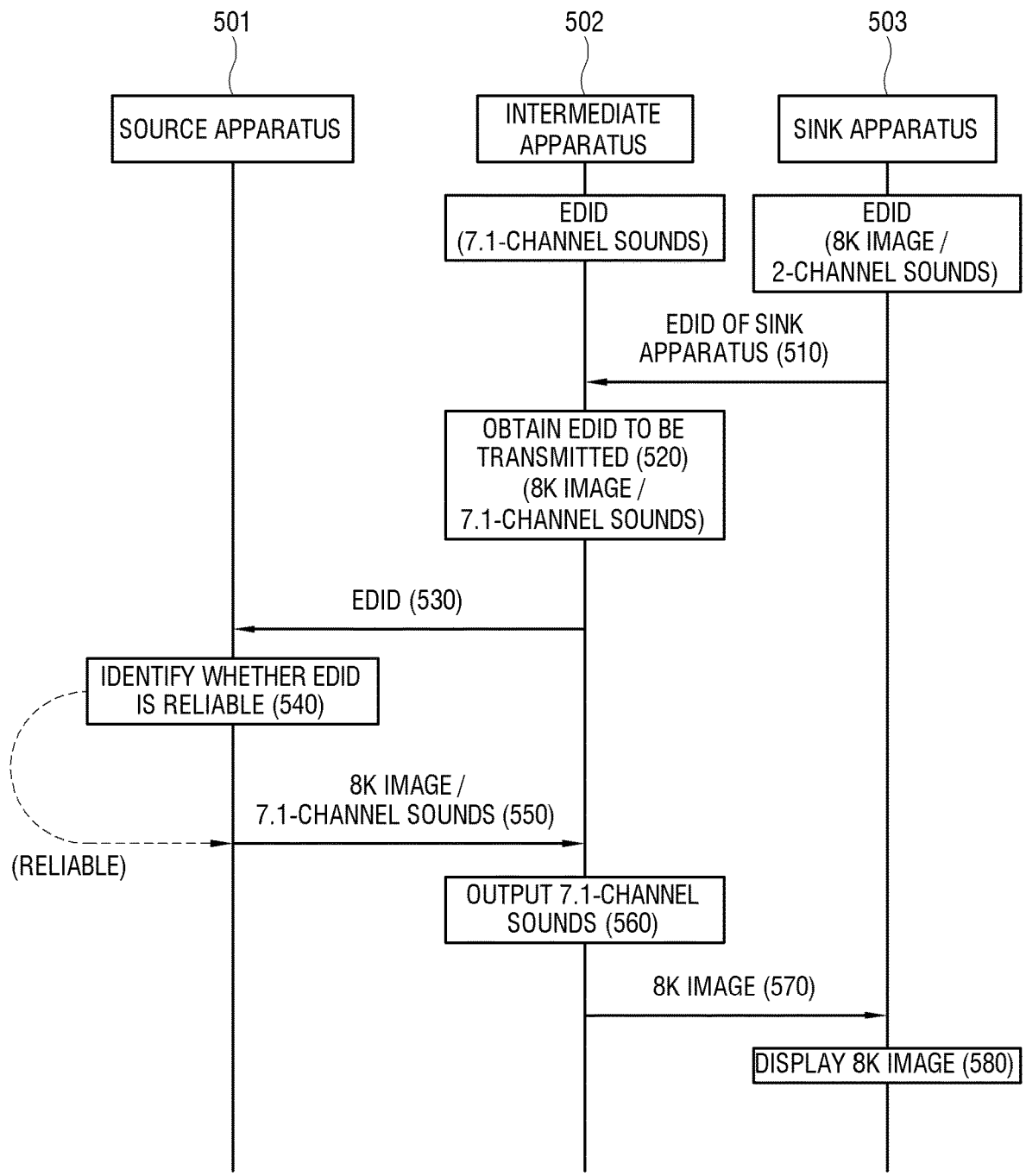
FIG. 5 is a signal flow diagram illustrating an example process of outputting a content signal when a source apparatus identifies that extended display identification data (EDID) obtained from an intermediate apparatus is reliable according to an embodiment of the disclosure.

FIG. 5 is a signal flow diagram illustrating an example process of outputting a content signal when a source apparatus identifies that the EDID obtained from an intermediate apparatus is reliable according to an embodiment of the disclosure.

As shown in FIG. 5, a source apparatus 501, an intermediate apparatus 502, and a sink apparatus 503 may be connected in series. In an example embodiment, the source apparatus 501, the intermediate apparatus 502, and the sink apparatus 503 are apparatuses capable of handling an 8K-class image. Further, in an example embodiment, it will be described that the sink apparatus 503 is designated to display an image and the intermediate apparatus 502 is designated to output a sound, based on a content signal output from the source apparatus 501.

When the intermediate apparatus 502 and the sink apparatus 503 are connected to each other, at operation 510 the intermediate apparatus 502 receives the EDID of the sink apparatus 503 from the sink apparatus 503. The EDID contains video information about images and audio information about sounds, which are supportable in the sink apparatus 503. For example, the EDID of the sink apparatus 503 may contain information that an 8K image and a 2-channel sound are supported.

The intermediate apparatus 502 is also storing its own EDID of the intermediate apparatus 502. The intermediate apparatus 502 can output a sound but cannot display an image. Therefore, the EDID of the intermediate apparatus 502 contains audio information about sounds without video information about images. For example, the EDID of the intermediate apparatus 502 may contain information that a 7.1-channel sound is supported.

When the intermediate apparatus 502 receives the EDID of the sink apparatus 503, at operation 520 the intermediate apparatus 502 obtains the EDID to be transmitted to the source apparatus 501 based on the EDID of the intermediate apparatus 502 and the EDID of the sink apparatus 503. For example, the intermediate apparatus 502 may maintain the video information in the EDID of the sink apparatus 503. In addition, the intermediate apparatus 502 may replace the audio information in the EDID of the sink apparatus 503 with the audio information in the EDID of the intermediate apparatus 502. The obtained EDID contains information an 8K-class image and the 7.1-channel sounds are supported.

The intermediate apparatus may generate a new EDID to be transmitted to the source apparatus 501, based on the EDID of the intermediate apparatus 502 and the EDID of the sink apparatus 503. For example, the intermediate apparatus 502 may obtain video information from the EDID of the sink apparatus 503 on which an image will be displayed, may obtain audio information from the EDID of the intermediate apparatus 502 to which a sound will be output, and may generate the EDID based on the obtained information.

When the intermediate apparatus 502 and the source apparatus 501 are connected, at operation 530 the source apparatus 501 obtains the foregoing EDID from the intermediate apparatus 502.

At operation 540 the source apparatus 501 identifies whether the obtained EDID is reliable. A detailed identification method of the source apparatus 501 will be described in greater detail below.

When it is identified that the identified EDID is reliable, at operation 550 the source apparatus 501 outputs a content signal, which includes the 8K-class image and the 7.1-channel sounds, to the intermediate apparatus 502 based on the obtained EDID.

When the content signal is received from the source apparatus 501, the intermediate apparatus 502 obtains the 8K-class video signal and the 7.1-channel audio signal from the content signal. At operation 560 the intermediate apparatus 502 outputs the 7.1-channel sounds. Further, at operation 570 the intermediate apparatus 502 outputs the 8K-class video signal to the sink apparatus 503.

When the video signal is received from the intermediate apparatus 502, at operation 580 the sink apparatus 503 displays the 8K-class image based on the video signal.

Such a series of the operations is possible because the intermediate apparatus 502 can support the 8K-class image and thus normally process the content signal including the 8K-class image output from the source apparatus 501. The source apparatus 501 identifies that the EDID obtained from the intermediate apparatus 502 is reliable, and outputs the content signal including the 8K-class image based on the EDID.

Below, an embodiment, in which the source apparatus 501 identifies that the EDID obtained from the intermediate apparatus 502 is not reliable, will be described in greater detail.

Figure 6:
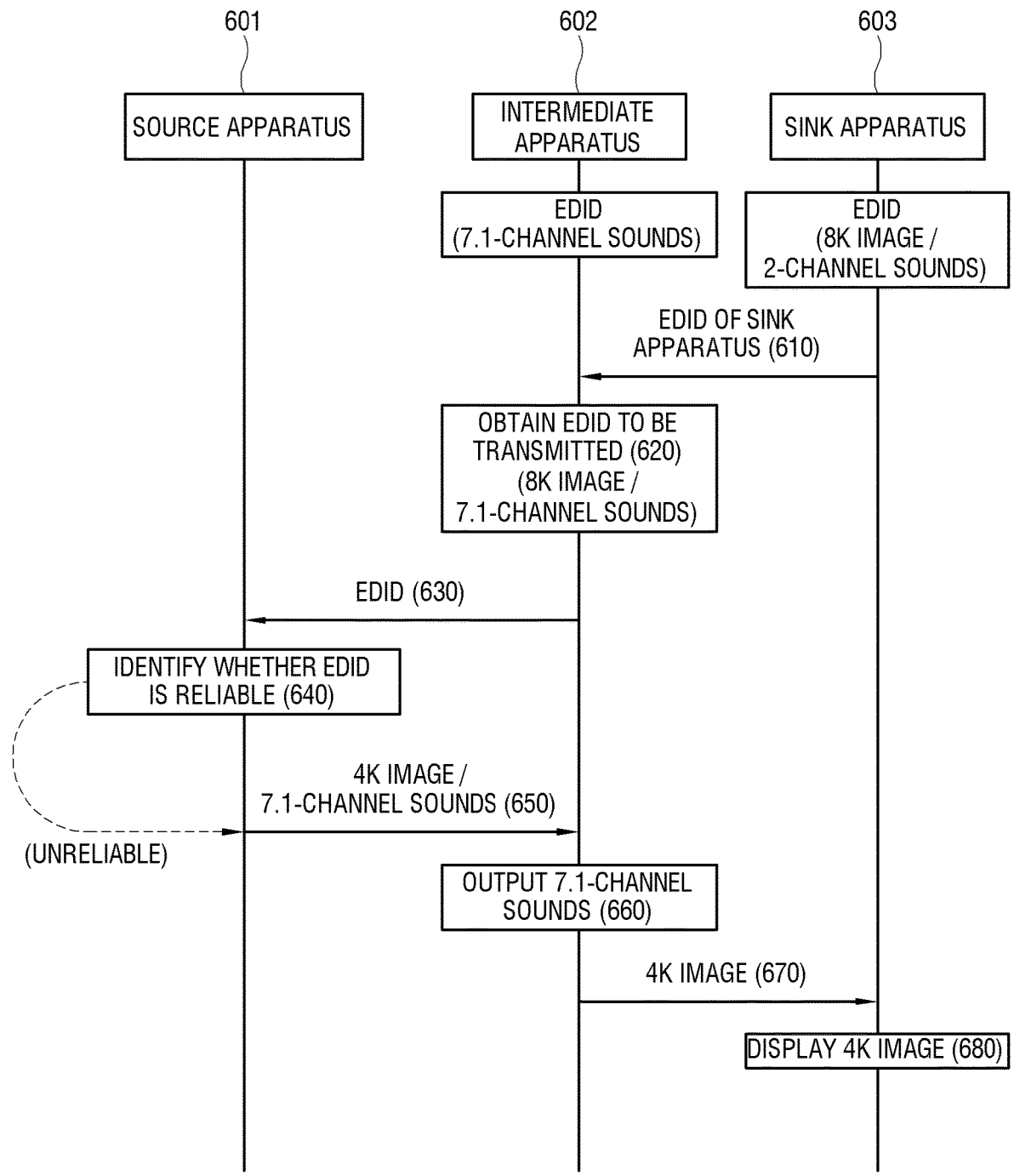
FIG. 6 is a signal flow diagram illustrating an example process of outputting a content signal when a source apparatus identifies that EDID obtained from an intermediate apparatus is not reliable according to an embodiment of the disclosure.

FIG. 6 is a signal flow diagram illustrating an example process of outputting a content signal when a source apparatus identifies that EDID obtained from an intermediate apparatus is not reliable according to an embodiment of the disclosure.

As shown in FIG. 6, a source apparatus 601, an intermediate apparatus 602, and a sink apparatus 603 are connected in series. This example embodiment is different from the previous embodiment in the processing performance of the intermediate apparatus 602 as compared with those of the source apparatus 601 and the sink apparatus 603. In an example embodiment, the source apparatus 601 and the sink apparatus 603 are apparatuses capable of handling an 8K-class image, but the intermediate apparatus 602 is an apparatus capable of processing an image up to the 4K class.

When the intermediate apparatus 602 and the sink apparatus 603 are connected to each other, at operation 610 the intermediate apparatus 602 receives the EDID of the sink apparatus 603 from the sink apparatus 603. For example, the EDID of the sink apparatus 603 contains information that the 8K-class image and the 2-channel sounds are supported. Meanwhile, the EDID of the intermediate apparatus 602, which is stored in the intermediate apparatus 602, contains information that the 7.1-channel sounds are supported.

When the EDID of the sink apparatus 603 is received in the intermediate apparatus 602, at operation 620 the intermediate apparatus 602 obtains the EDID to be transmitted to the source apparatus 501, based on the EDID of the intermediate apparatus 602 and the EDID of the sink apparatus 603. The method of obtaining the EDID is the same as described in the previous embodiment. For example, the EDID contains information that the 8K-class image and the 7.1-channel sounds are supported.

When the intermediate apparatus 602 and the source apparatus 601 are connected, at operation 630 the source apparatus 601 obtains the EDID from the intermediate apparatus 602. In an example embodiment, the operations up to now are substantially the same as those in the previous embodiment.

At operation 640 the source apparatus 601 identifies whether the obtained EDID is reliable.

When it is identified that the obtained EDID is not reliable, the source apparatus 601 outputs a content signal including an image which is not based on the information contained in the obtained EDID but has an image quality lower than that of the image based on the information of the obtained EDID. For example, when the obtained EDID contains information that the 8K-class image is supportable, at operation 650 the source apparatus 601 outputs a content signal including an image, which has an image quality of the 4K class lower than the 8K class, to the intermediate apparatus 602.

For example, the source apparatus 601 may generate a content signal based on one resolution between 8K and 4K when content is reproduced.

When it is identified that the obtained EDID is not reliable, the source apparatus 601 selects an image format based on previously defined settings. For example, the source apparatus 601 may select an image of FHD or the like resolution lower than UHD or the like resolution based on the information of the obtained EDID. Further, in an example embodiment, the source apparatus 601 selects an image having a resolution lower than the resolution based on the EDID, but the criterion for the image quality is not only the resolutions. For example, when the EDID shows the number of frames per second or a refresh rate of 144, and the source apparatus 601 identifies that the EDID is not reliable, an image having a refresh rate of 60 Hz may be selected.

In an example embodiment, the descriptions are related to only an image. However, the same principle may be applied to a sound.

When the content signal is received from the source apparatus 601, the intermediate apparatus 602 obtains the 4K-class video signal and the 7.1-channel audio signal from the content signal. At operation 660 the intermediate apparatus 602 outputs the 7.1-channel sounds. Further, the intermediate apparatus 602 can process the video signal because the video signal of not the 8K class based on the EDID formerly transmitted to the source apparatus 601 but the 4K class is obtained. Thus, at operation 670 the intermediate apparatus 602 outputs the 4K-class video signal to the sink apparatus 603.

When the video signal is received from the intermediate apparatus 602, at operation 680 the sink apparatus 603 displays the 4K-class image based on the video signal.

The source apparatus 601 according to an example embodiment outputs the content signal having the image format, of which the resolution is lower than that of the image format based on the EDID, to the intermediate apparatus 602 when it is identified that the EDID obtained from the intermediate apparatus 602 is not reliable. Thus, the output image format is identified by identifying whether it is supported by the intermediate apparatus 602 based on the reliability of the EDID even though the EDID transmitted to the source apparatus 601 does not accurately reflect the supporting function of the intermediate apparatus 602, thereby preventing the image from being abnormally displayed on the sink apparatus 603 as the intermediate apparatus 602 does not support the function.

There are many criteria for the source apparatus 601 to identify whether the EDID obtained from the intermediate apparatus 602 is reliable. In a case of an 8K-class image, the 8K-class image may for example be normally transmitted in communication based on the HDMI 2.1 or higher transmission interface protocols. For example, when a level of an image based on the information included in the obtained EDID is the 8K class at frames per seconds exceeding 30 Hz, the source apparatus 601 identifies whether the transmission interface protocol between the source apparatus 601 and the intermediate apparatus 602 is the HDMI 2.1 or higher. When it is identified that the transmission interface protocol is the HDMI 2.1 or higher, the source apparatus 601 may identify that the obtained EDID is reliable. Of course, the source apparatus 601 may output a content signal based on not the HDMI but the DP or the like different transmission interface protocol. However, an example embodiment will be described focusing on the case of the HDMI for convenience and ease of description.

Below, descriptions will be given with regard to various methods of the source apparatus 601 to identify whether the obtained EDID is reliable when the corresponding EDID contains information that the 8K-class image is supportable.

Figure 7:
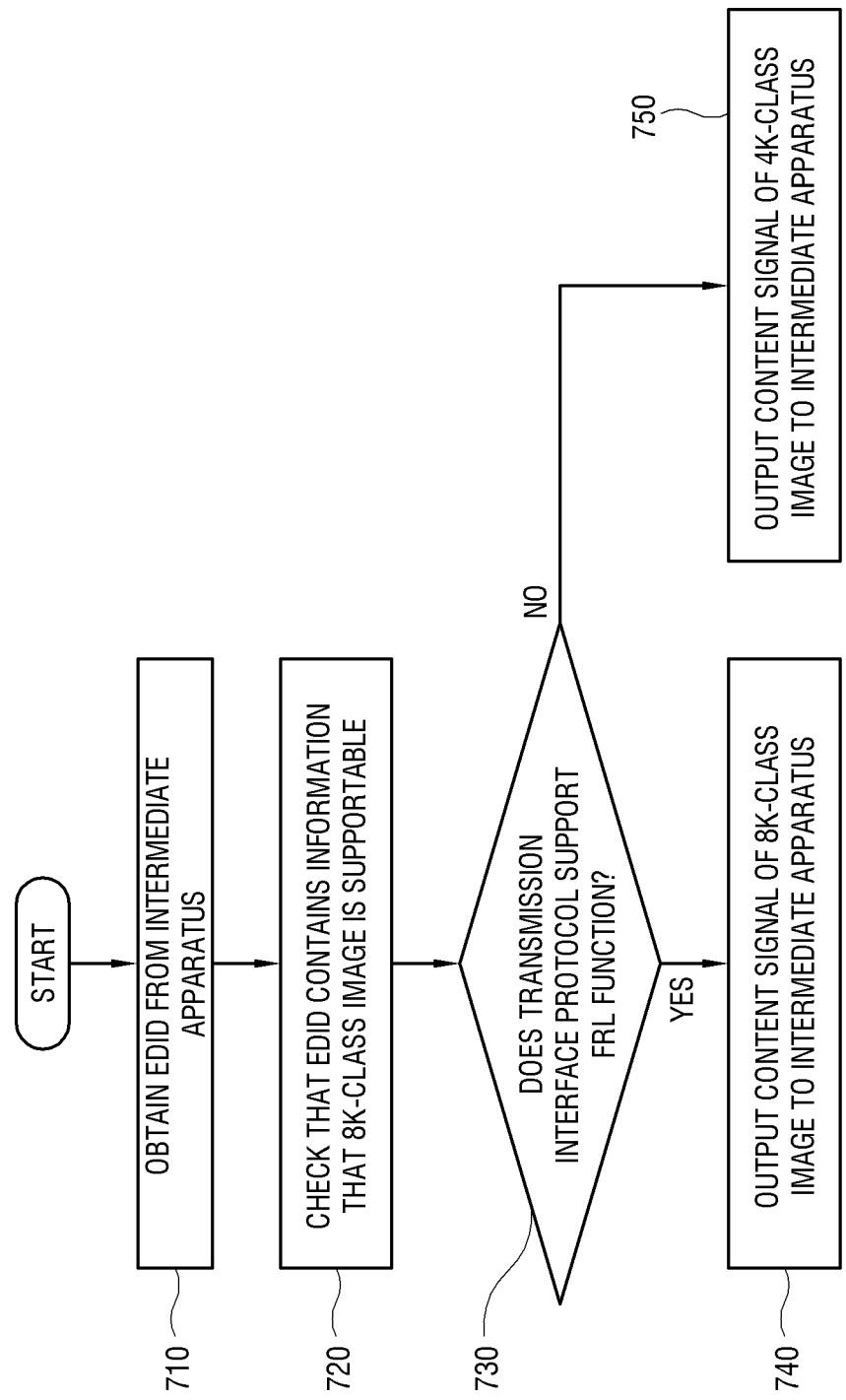
FIG. 7 is a flowchart illustrating an example method that a source apparatus identifies reliability of EDID based on a fixed rate link (FRL) function according to an embodiment of the disclosure.

FIG. 7 is a flowchart illustrating an example method that a source apparatus identifies reliability of EDID based on a fixed rate link (FRL) function according to an embodiment of the disclosure.

As shown in FIG. 7, the following operations may be performed by the processor of the source apparatus.

At operation 710 the source apparatus obtains the EDID from the intermediate apparatus. The EDID may for example include information about a predetermined first image format supported in the sink apparatus connected to the intermediate apparatus.

At operation 720 the source apparatus checks that the obtained EDID contains information that the 8K-class image is supportable.

At operation 730 the source apparatus identifies whether the transmission interface protocol between the source apparatus and the intermediate apparatus supports an FRL function. The FRL function may refer, for example, to a transmission mode in which a predetermined line between two apparatuses is used in transmitting data. For example, the source apparatus identifies whether the external apparatus supports a transmission mode in which a predetermined signal line is used in transmitting data between the source apparatus and the intermediate apparatus. That the external apparatus supports the transmission mode may refer, for example, to the external apparatus supporting an interface protocol by which a content signal of an 8K-class image is transmittable. On the other hand, that the external apparatus does not support the transmission mode may refer, for example, to the external apparatus not supporting the interface protocol by which the content signal of the 8K-class image is transmittable.

When it is identified that the transmission interface protocol supports the FRL function ("Yes" at operation 730), at operation 740 the source apparatus outputs the content signal of the 8K-class image based on the EDID to the intermediate apparatus. For example, the source apparatus in this case outputs the content signal having the first image format.

On the other hand, when it is identified that the transmission interface protocol does not support the FRL function ("No" at operation 730), at operation 750 the source apparatus outputs a content signal of an image having an image quality lower than that of the EDID, e.g., a 4K-class image to the intermediate apparatus. For example, the source apparatus in this case outputs the content signal having the second image format different from the first image format.

Below, the FRL function will be described in greater detail.

FIG. 8 is a diagram illustrating example fields of status and control data channel (SCDC) update flags prescribed in the HDMI 2.1;

As shown in FIG. 8, the HDMI 2.1 prescribes various values of update flags accessed through an SCDC. The SCDC refers to a protocol supported in HDMI 2.0, e.g., a one-to-one communication protocol for data exchange between a Tx and an Rx. For example, the Tx may correspond to the source apparatus, and the Rx may correspond to the intermediate apparatus. The SCDC may refer, for example, to an I2C based communication channel like a DDC.

The FRL may refer, for example, to a new data-transmission method introduced in the HDMI 2.1. According to the FRL, the Tx transmits video and audio data to the Rx through a clock channel used in the previous HDMI, e.g., a pair of differential signal lines for transmitting the clock signal. For example, the FRL employs the clock channel of the previous HDMI version as the data channel, thereby securing a total of four differential pairs of the data channels one more than those of the previous HDMI version. The previous HDMI employs three data channels and one clock channel, whereas the HDMI 2.1 employs four data channels and embeds a clock signal in a data signal.

The Rx may store an HDMI forum-vendor specific data block (HF-VSDB) accessible by the Tx through the SCDC in a register. When the FRL is supported, the Rx records a value, which shows that the FRL is supported, in a specific address of the register. The Tx obtains the recorded value by accessing the corresponding address of the register, thereby identifying whether the Rx supports the FRL.

For example, in the register of the Rx, a field of Bit 4 at the address of 0x 10 is designated as FRL_start. When the Rx supports the FRL, FRL_start is set to 1. When the Rx does not support the FRL, FRL_start is set to 0. When the Tx accesses the register of the Rx and identifies that the Rx supports the FRL, the Tx performs link training by transmitting a training signal to the Rx and standing by for a response. When the response to the training signal is normally received from the Rx, the Tx identifies that the Rx supports the FRL function. On the other hand, when the response to the training signal is not normally received from the Rx, the Tx identifies that the Rx does not support the FRL function. In this case, the Tx may modify the value of Bit 4 at the address of 0x 10 into 0 in the register of the Rx.

The Tx identifies whether the transmission interface protocol of the Rx supports the FRL function, based on the value at the preset address in the register of the Rx.

When the EDID contains information that the 8K-class image is supportable, there are no limits to the method of identifying whether the corresponding EDID is reliable, and various methods may be used as follows.

Figure 9:
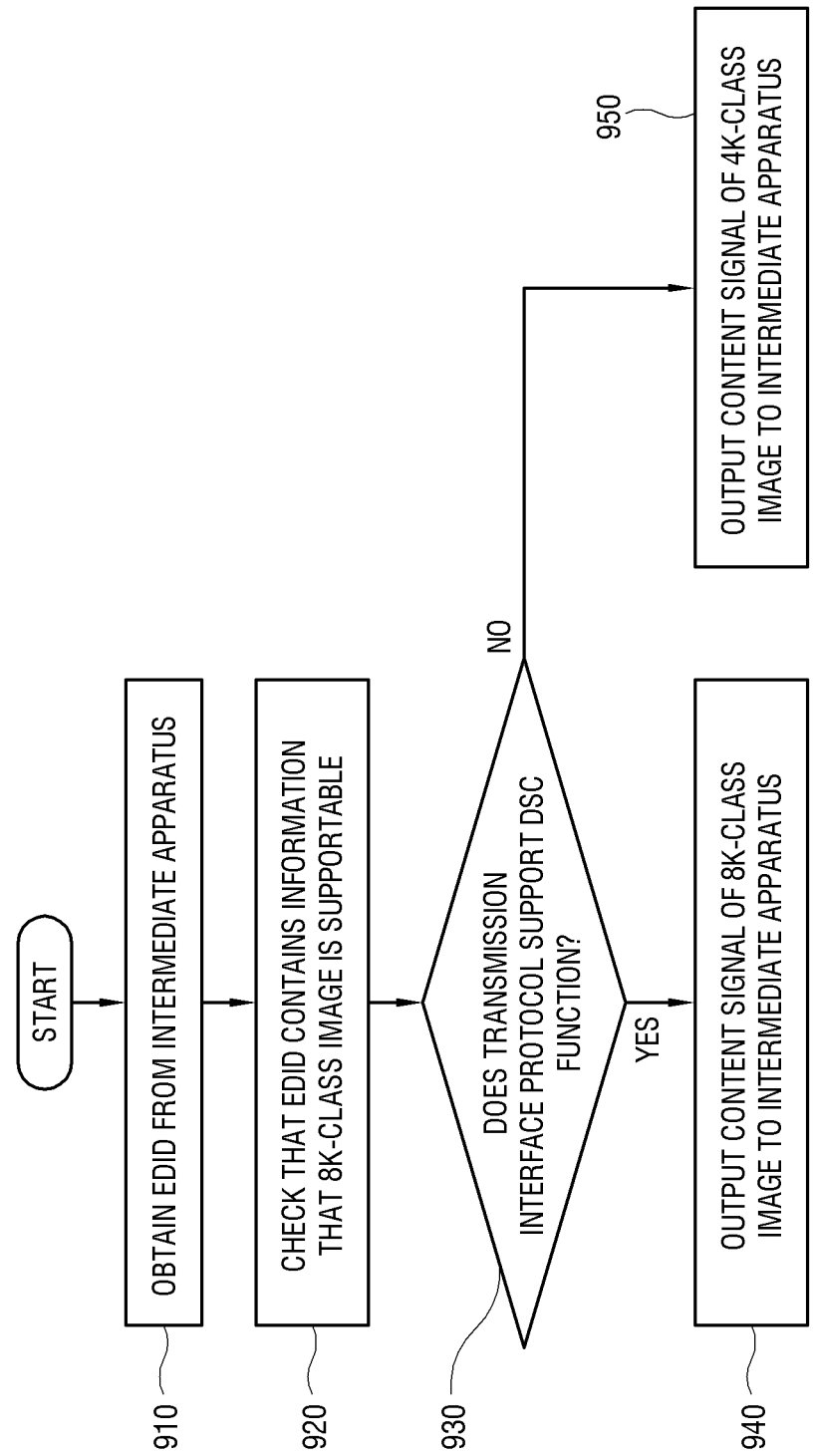
FIG. 9 is a flowchart illustrating an example method that a source apparatus identifies reliability of EDID based on a display stream compression (DSC) function according to an embodiment of the disclosure.

FIG. 9 is a flowchart illustrating an example method that a source apparatus identifies reliability of EDID based on a display stream compression (DSC) function according to an embodiment of the disclosure.

As shown in FIG. 9, the following operations may be performed by the processor of the source apparatus.

At operation 910 the source apparatus obtains the EDID from the intermediate apparatus.

At operation 920 the source apparatus checks that the obtained EDID contains information that the 8K-class image is supportable.

At operation 930 the source apparatus identifies whether the transmission interface protocol between the source apparatus and the intermediate apparatus supports a DSC function.

When it is identified that the transmission interface protocol supports the DSC function ("Yes" at operation 930), at operation 940 the source apparatus outputs the content signal of the 8K-class image based on the EDID to the intermediate apparatus.

On the other hand, when it is identified that the transmission interface protocol does not support the DSC function ("No" at operation 930), at operation 950 the source apparatus outputs a content signal of an image having an image quality lower than that of the EDID, e.g., a 4K-class image to the intermediate apparatus.

Below, the DSC function will be described in greater detail.

FIG. 10 is a diagram illustrating example fields of status flags and a SCDC source test configuration prescribed in the HDMI 2.1.

As shown in FIG. 10, the HDMI 2.1 prescribes various values of a source test configuration and status flags. Such values are recorded in the register of the Rx accessible by the Tx.

The DSC may refer, for example, to technology of compressing image data in real time, while the Tx transmits the image data to the Rx. The HDMI typically refers to a protocol prepared for transmitting uncompressed image data, and the HDMI 2.1 refers to a high-speed interface protocol of which a data transmission rate is higher than that of the previous HDMI. However, when the image data has an 8K-class and the like ultra-high resolution or the refresh rate is high, it may be difficult for the HDMI 2.1 based communication to normally transmit the image data. Thus, the Tx compresses the image data in real time based on the DSC technology, so that the image data having the ultra-high image quality can be normally transmitted to the Rx.

The DSC is used while the FRL function is activated. For example, when the image data is transmitted to the Rx based on the HDMI 2.1 but it is difficult to normally transmit the image data by even the FRL function, the Tx may additionally employ the DSC function to compress and transmit the image data in real time.

Regarding the DSC, in the register of the Rx, Bit 6 at the address of 0x 35 is designated as DSC_FRL_Max, and Bit 7 at 0x 40 is designated as DSC_DecoderFail. When accessing or reading a valid value at the address in the register of the Rx, in other words, when the value is not null, the Tx identifies that the Rx supports the DSC.

When DSC_FRL_Max of the Rx has a value of 1, the Tx activates a link to a lesser one between DSC_Max_FRL_Rate and the highest FRL_Rate supporting the compressed-image transmission in the HF-VSDB of the Rx, and performs link training before transmitting the compressed image data. DSC_DecoderFail reflects whether the image data compressed in the Rx is successfully decompressed, in real time. When failures of DSC decoding are continued, the Rx sets the value of this field into 1.

The Tx identifies whether the intermediate apparatus supports the DSC function, by checking the field of DSC_FRL_Max or DSC_DecoderFail in the register of the Rx.

Figure 11:
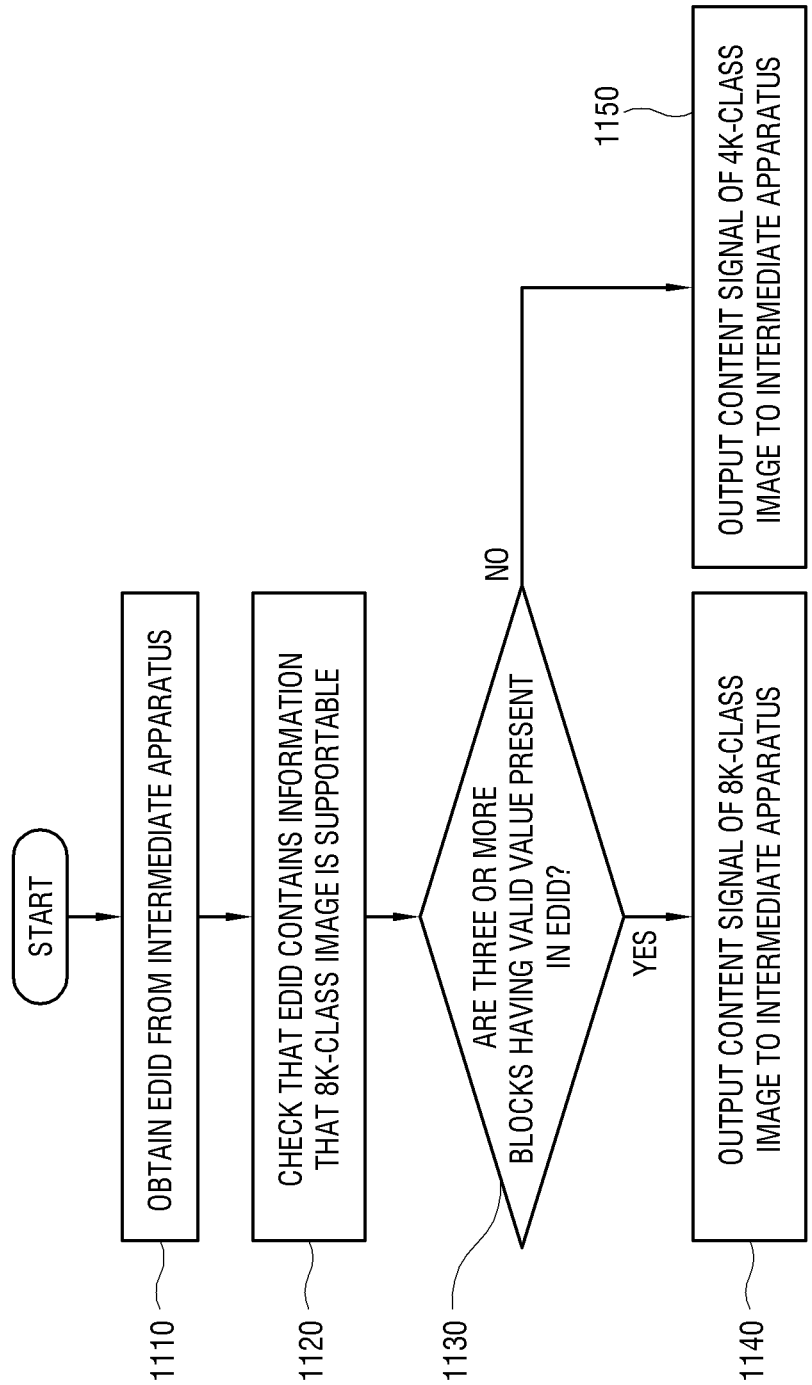
FIG. 11 is a flowchart illustrating an example method that a source apparatus identifies reliability of EDID based on the number of valid blocks in the EDID obtained from an intermediate apparatus according to an embodiment of the disclosure.

FIG. 11 is a flowchart illustrating an example method that a source apparatus identifies reliability of EDID based on the number of valid blocks in the EDID obtained from an intermediate apparatus according to an embodiment of the disclosure.

As shown in FIG. 11, the following operations may be performed by the processor of the source apparatus.

At operation 1110 the source apparatus obtains the EDID from the intermediate apparatus.

At operation 1120 the source apparatus checks that the obtained EDID contains information that the 8K-class image is supportable.

At operation 1130 the source apparatus identifies whether three or more blocks having a valid value are present in the obtained EDID.

When it is identified that three or more blocks having the valid value are present in the EDID ("Yes" at operation 1130), at operation 1140 the source apparatus outputs the content signal of the 8K-class image based on the EDID to the intermediate apparatus.

On the other hand, when it is identified that three or more blocks having the valid value are not present in the EDID ("No" at operation 1130), at operation 1150 the source apparatus outputs a content signal of an image having an image quality lower than that of the EDID, e.g., a 4K-class image to the intermediate apparatus.

Below, the structure of the EDID will be described in greater detail.

Figure 12:
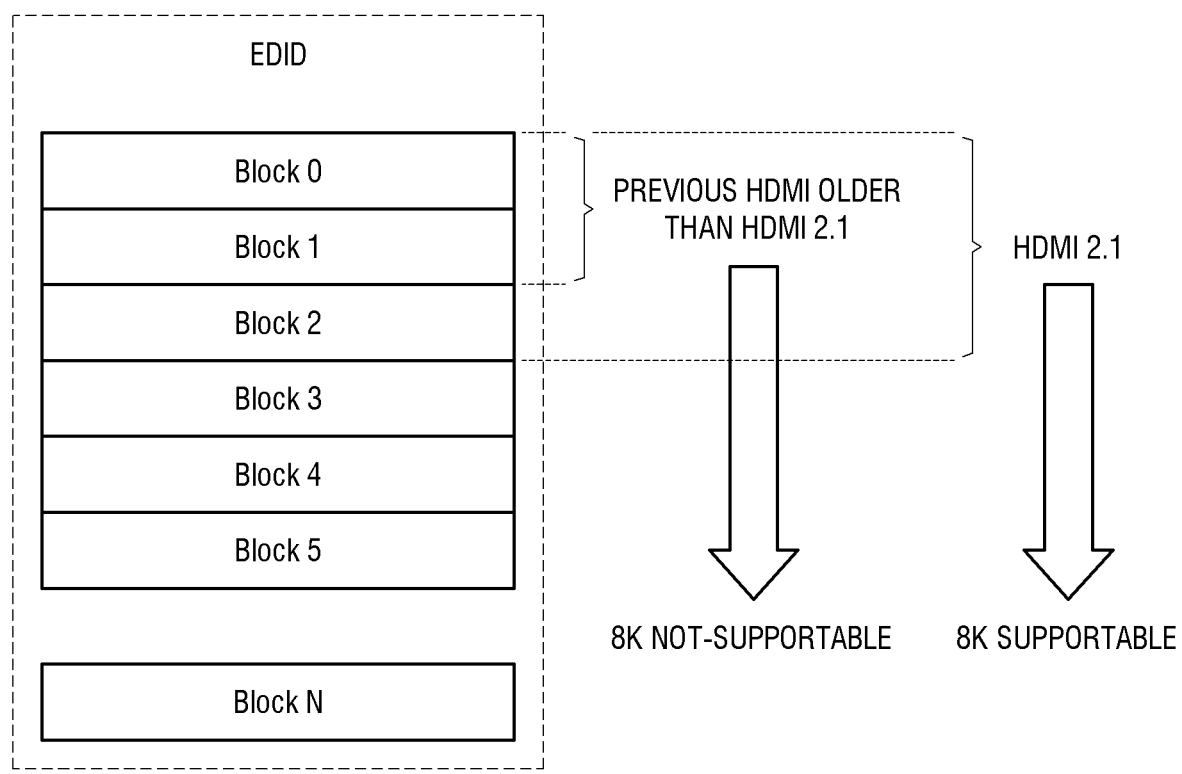
FIG. 12 is a diagram illustrating an example structure of blocks in EDID according to an embodiment of the disclosure.

FIG. 12 is a diagram illustrating an example structure of blocks in the EDID according to an embodiment of the disclosure.

As shown in FIG. 12, the EDID may include a plurality of blocks for recording various pieces of information related to the apparatuses. The EDID may refer, for example, to a protocol prescribed by video electronics standards association (VESA). The EDID may record various pieces of information about the characteristics and functions of the apparatuses.

In a case of the display apparatus, the EDID may include, for example, a header, product identification (ID) information, EDID version information, basic display variables, color space definition, timing information of all the resolutions supported in the display, extended flags, a checksum, and the like information. The product ID information may include, for example, ID of a manufacturer, a product ID code, a serial number, a manufacture date, etc. The basic display variables may include, for example, an image input type, a display size, power management, a gamma value, a timing function, configuration settings, etc.

The EDID includes N blocks, and the above-mentioned pieces of information are recorded in the blocks. In the previous HDMI older than the HDMI 2.1, typically two blocks are used in generating the EDID. However, the amount of information to be recorded in the EDID increases in the HDMI 2.1, and therefore the HDMI 2.1 employs three or more blocks in recording the information.

In other words, when the EDID obtained from the Rx employs two or less blocks in recording the information, the Tx identifies that the EDID corresponds to the previous HDMI older than the HDMI 2.1, and identifies that the transmission of the 8K-class image is not supported. On the other hand, when the EDID obtained from the Rx employs three or more blocks in recording the information, the Tx identifies that the EDID corresponds to the HDMI 2.1 or higher, and identifies that the transmission of the 8K-class image is supported.

The Tx may identify that the block having a valid value, for example, the block of which the value is not null, among the blocks of the EDID is used in recording the information. Further, the Tx may identify that the block having an invalid value, for example, the block of which the value is null, among the blocks of the EDID is not used in recording the information.

The Tx may identify whether the Rx supports the HDMI 2.1 or higher, based on the number of blocks having a valid value in the EDID obtained from the Rx.

Figure 13:
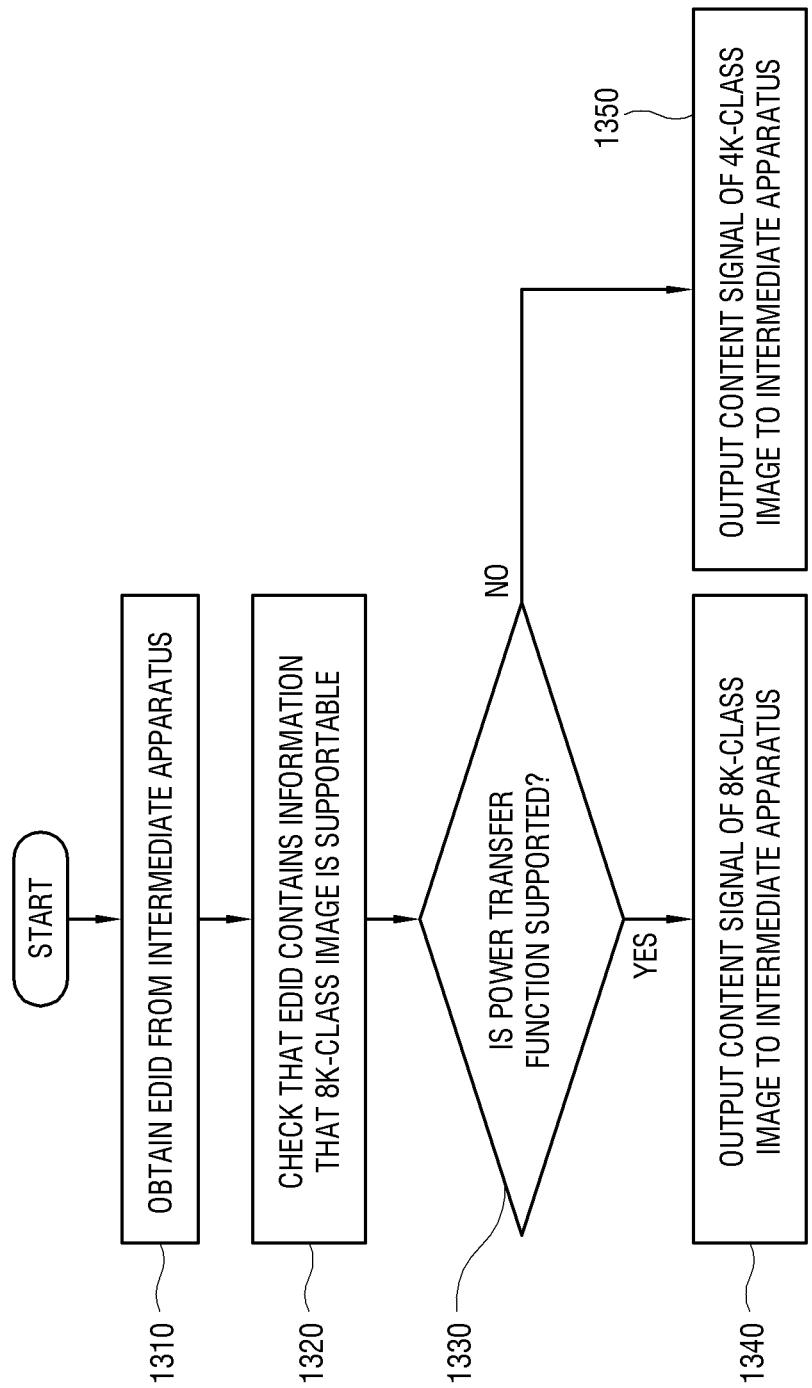
FIG. 13 is a flowchart illustrating an example method that a source apparatus identifies reliability of EDID based on whether an intermediate apparatus supports a power transfer function according to an embodiment of the disclosure.

FIG. 13 is a flowchart illustrating an example method that a source apparatus identifies reliability of EDID based on whether an intermediate apparatus supports a power transfer function according to an embodiment of the disclosure.

As shown in FIG. 13, the following operations may be performed by the processor of the source apparatus.

At operation 1310 the source apparatus obtains the EDID from the intermediate apparatus.

At operation 1320 the source apparatus checks that the obtained EDID contains information that the 8K-class image is supportable.

At operation 1330 the source apparatus identifies whether the intermediate apparatus supports the power transfer function.

When it is identified that the intermediate apparatus supports the power transfer function ("Yes" at operation 1330), at operation 1340 the source apparatus outputs the content signal of the 8K-class image based on the EDID to the intermediate apparatus.

On the other hand, when it is identified that the intermediate apparatus does not support the power transfer function ("No" at operation 1330), at operation 1350 the source apparatus outputs a content signal of an image having an image quality lower than that of the EDID, e.g., a 4K-class image to the intermediate apparatus.

Below, the power transfer function will be described in greater detail.

The power transfer function may refer, for example, to a function of transferring power having a predetermined voltage from the Tx to the Rx or from the Rx to the Tx through a specific pin of a port, in a structure that the port of the Tx and the port of the Rx are connected by a cable. A USB protocol supports the power transfer function, and thus a voltage of 5V is transferred through a specific pin. However, in a case of the HDMI, even the HDMI 2.1 does not support the power transfer function. In the future, the following HDMI newer than the HDMI 2.1 is expected to support the power transfer function. Therefore, if there is an HDMI protocol supporting the power transfer function, it is analogized as the following HDMI at least newer than the HDMI 2.1. Therefore, the Tx in this case may identify that the Rx supports the protocol enough to transmit the 8K-class image.

Various detailed methods of the Tx are possible to identify whether the Rx supports the power transfer function. For example, the Tx may identify whether the Rx supports the power transfer function, by checking a preset field value related to the power transfer function recorded in the SCDC register of the Rx. Alternatively, the Tx may detect a voltage applied to a pin provided for supplying and receiving the voltage among the pins of the signal input/output unit connected to the Rx.

The Tx may identify whether the 8K-class image is transmittable by the HDMI protocol, based on whether the HDMI supports the power transfer function.

Figure 14:
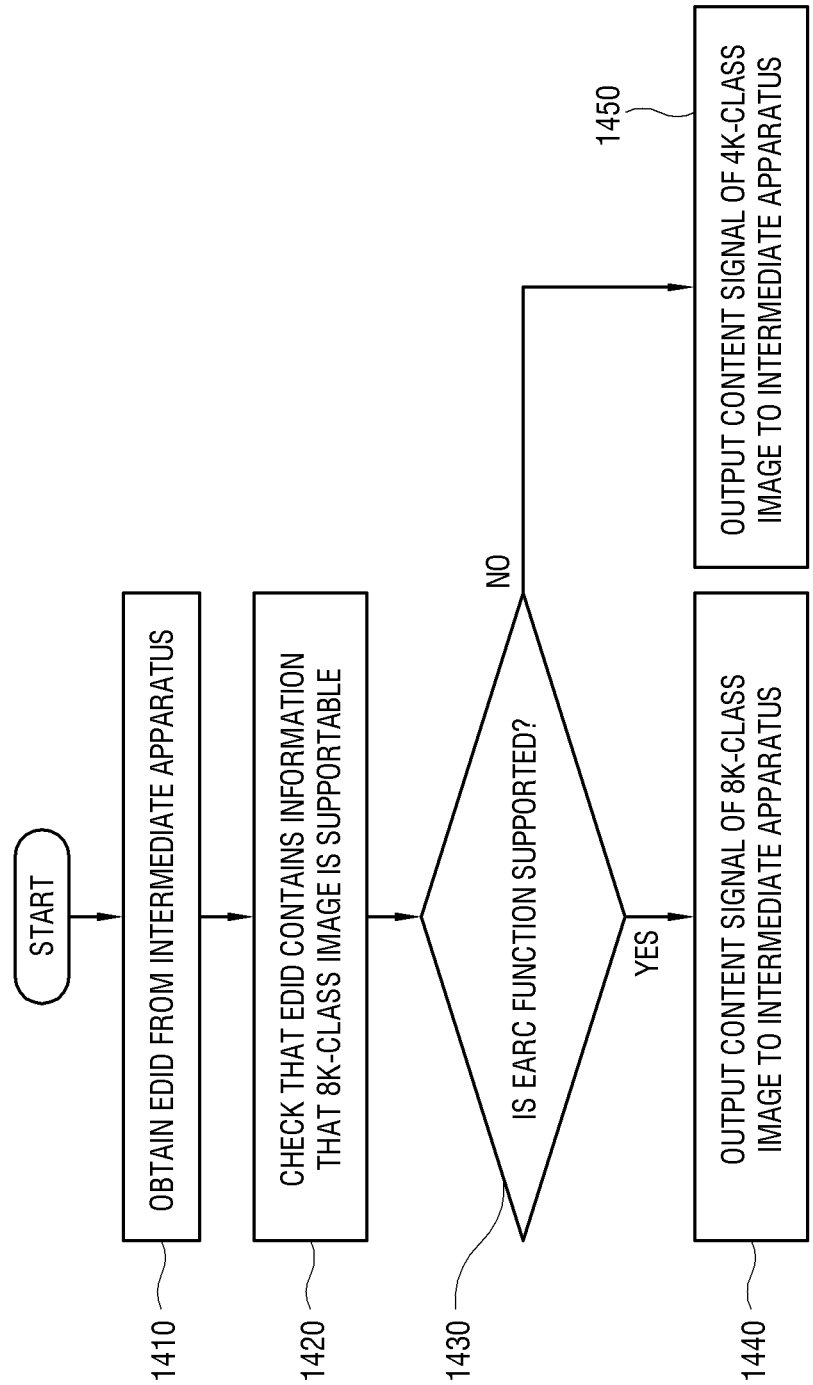
FIG. 14 is a flowchart illustrating an example method that a source apparatus identifies reliability of EDID based on whether an intermediate apparatus supports an enhanced audio return channel (eARC) function according to an embodiment of the disclosure.

FIG. 14 is a flowchart illustrating an example method that a source apparatus identifies reliability of EDID based on whether an intermediate apparatus supports an enhanced audio return channel (eARC) function according to an embodiment of the disclosure.

As shown in FIG. 14, the following operations may be performed by the processor of the source apparatus.

At operation 1410 the source apparatus obtains the EDID from the intermediate apparatus.

At operation 1420 the source apparatus checks that the obtained EDID contains information that the 8K-class image is supportable.

At operation 1430 the source apparatus identifies whether the intermediate apparatus supports the eARC function.

When it is identified that the intermediate apparatus supports the eARC function ("Yes" at operation 1430), at operation 1440 the source apparatus outputs the content signal of the 8K-class image based on the EDID to the intermediate apparatus.

On the other hand, when it is identified that the intermediate apparatus does not support the eARC function ("No" at operation 1430), at operation 1450 the source apparatus outputs a content signal of an image having an image quality lower than that of the EDID, e.g., a 4K-class image to the intermediate apparatus.

Below, the eARC function will be described in greater detail.

Figure 15:
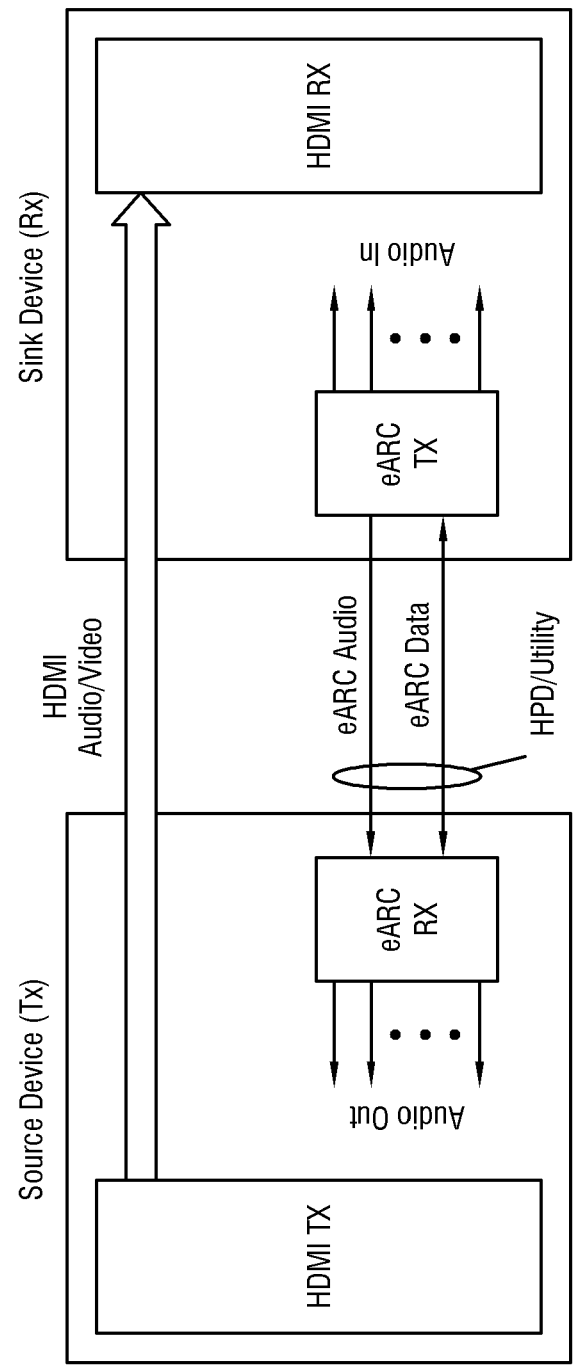
FIG. 15 is a diagram illustrating an example eARC function in HDMI communication between Tx and Rx according to an embodiment of the disclosure.

FIG. 15 is diagram illustrating an example eARC function in HDMI communication between the Tx and the Rx according to an embodiment of the disclosure.

As shown in FIG. 15, the eARC function is a major function of the HDMI 2.1, which transmits an audio signal from the Rx to the Tx. The eARC includes a half-duplex communication channel for communication between an eARC Tx and an eARC Rx. The eARC transmission direction is opposite to the transmission direction of an HDMI content signal. When the Tx transmits a content signal to the Rx through an HDMI connector, the Rx extracts an audio signal from the content signal and outputs the extracted audio signal to the Tx through the eARC on the different HDMI connector. When the eARC is activated, the Tx operating as the eARC Rx is not required to provide the content signal to the Rx operating as the eARC Tx. When the high-speed TMDS or FRL is inactivated, the Rx supporting the eARC Tx may transmit an eARC audio signal.

To identify whether the Rx supports the eARC function, the Tx checks the $14^{th}$ pin and the $19^{th}$ pin among the pins of the HDMI. The $14^{th}$ pin and the $19^{th}$ pin of the HDMI are utility signal lines used in the eARC. When communication with the Rx connected using these signal lines is possible, the Tx may identify that the Rx supports the eARC function.

The Tx may identify whether the Rx supports the HDMI 2.1, based on whether the Rx supports the eARC function.

As described in the foregoing embodiments, the content signal including the 8K-class image is transmittable between the apparatuses through the transmission interface of at least the HDMI 2.1 or higher. In terms of providing the content signal to the sink apparatus via the intermediate apparatus, the source apparatus selects the image quality of the image of the content signal based on whether the intermediate apparatus supports the HDMI 2.1, and outputs the content signal including the image of the selected image quality to the intermediate apparatus. For example, the foregoing five criteria may be used in identifying whether the intermediate apparatus supports the HDMI 2.1.

In the foregoing embodiments, the source apparatus individually uses the criteria such as the FRL function, the DSC function, the number of valid blocks in the EDID, the power transfer function, the eARC function, etc. for the identification. However, the source apparatus may use a plurality of criteria for more accurate identification. Below, such an embodiment will be described.

Figure 16:
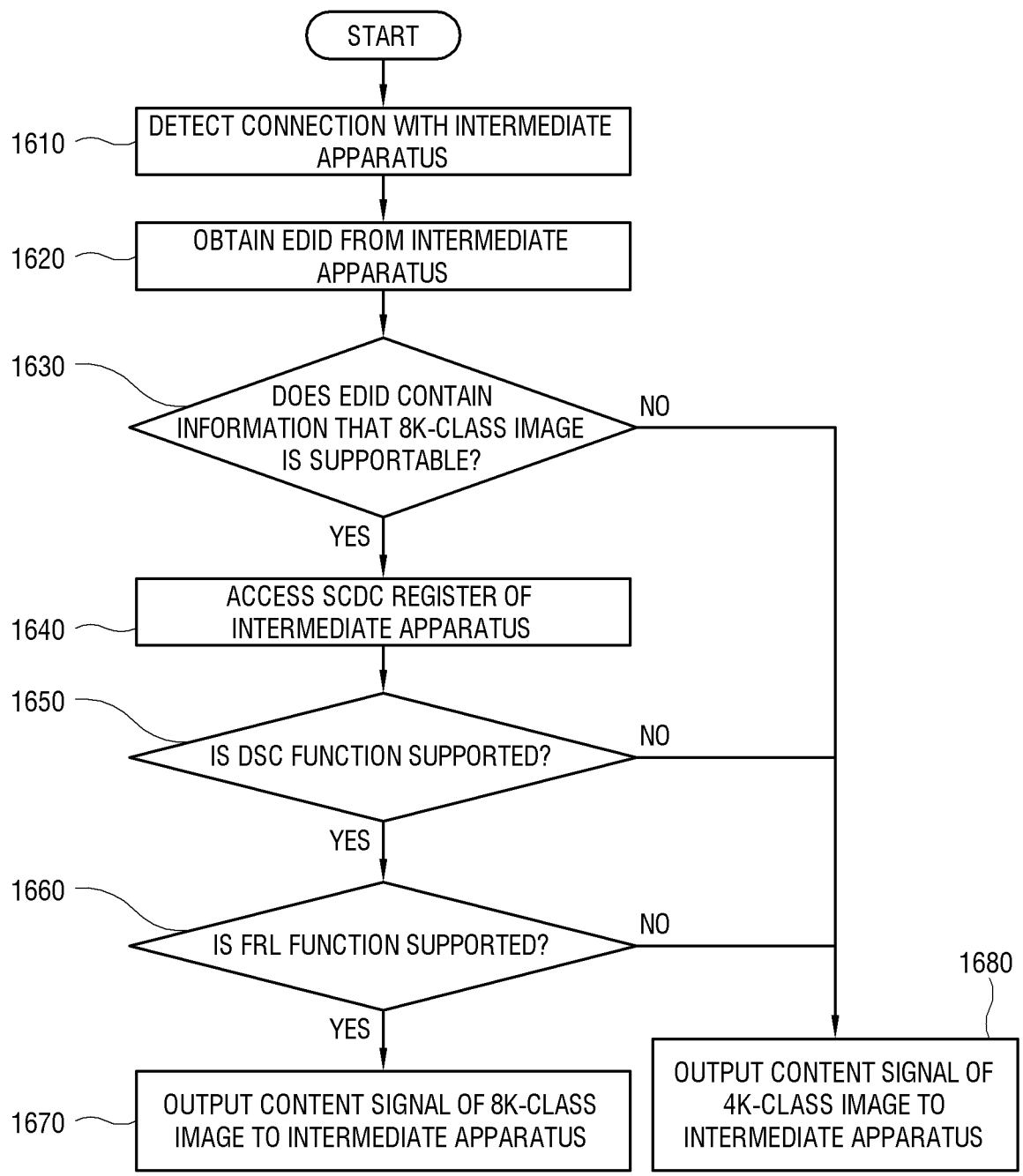
FIG. 16 is a flowchart illustrating an example method that a source apparatus identifies reliability of EDID based on whether two functions of FRL and DSC are supported and outputs a content signal according to an embodiment of the disclosure.

FIG. 16 is a flowchart illustrating an example method that a source apparatus identifies reliability of EDID based on whether two functions of FRL and DSC are supported and outputs a content signal according to an embodiment of the disclosure.

As shown in FIG. 16, the following operations may be performed by the processor of the source apparatus.

At operation 1610 the source apparatus detects connection with the intermediate apparatus. For example, when the source apparatus and the intermediate apparatus are physically connected through an HDMI cable, the source apparatus can detect the connection with the intermediate apparatus based on triggering using a hot plug detect (HPD) line of the HDMI.

At operation 1620 the source apparatus obtains the EDID from the intermediate apparatus. This EDID is generated based on information about the EDID of the sink apparatus and the EDID of the intermediate apparatus.

At operation 1630 the source apparatus identifies whether the obtained EDID is recorded or includes information to support the 8K-class image.

When the obtained EDID is recorded to support the 8K-class image ("Yes" at operation 1630), at operation 1640 the source apparatus accesses the SCDC register of the intermediate apparatus.

At operation 1650 the source apparatus identifies whether the intermediate apparatus supports the DSC function in the accessed SCDC register.

When it is identified that the intermediate apparatus supports the DSC function ("Yes" at operation 1650), at operation 1660 the source apparatus identifies whether the intermediate apparatus supports the FRL function in the accessed SCDC register.

When it is identified that the intermediate apparatus supports the FRL function ("Yes" at operation 1660), at operation 1670 the source apparatus outputs the content signal of the 8K-class image based on the EDID to the intermediate apparatus On the other hand, when it is identified in the operation 1660 that the intermediate apparatus does not support the FRL function ("No" at operation 1660), when it is identified in the operation 1650 that the intermediate apparatus does not support the DSC function ("No" at operation 1650), or when it is identified in the operation 1630 that the EDID is not recorded to support the 8K-class image ("No" at operation 1630), at operation 1680 the source apparatus outputs a content signal of an image having an image quality lower than that of the EDID, e.g., a 4K-class image to the intermediate apparatus.

In an example embodiment, two criteria of both the DSC and the FRL are taken into account. However, three or more criteria may be taken into account. When accurate identification is required regardless of system load, the source apparatus may for example perform the identification by taking all the five criteria into account. When the plurality of criteria is previously prioritized, the source apparatus may apply the criteria according to preset order of priority.

The source apparatus may select the criterion suitable for the apparatus or the use environment among the plurality of criteria. For example, when where the FRL function, the DSC function, the number of EDID blocks having a valid value, the power transfer function, the eARC function, and the like criterion are given, and the transmission interface protocol between the source apparatus and the intermediate apparatus is identified as the HDMI, the source apparatus may select the criteria based on the FRL function, the DSC function and the eARC function. Alternatively, when the transmission interface protocol is identified as the DisplayPort, the source apparatus may select the criteria based on the DSC function and the number of EDID blocks having a valid value.

The source apparatus may display a user interface (UI) which allows a user to select the plurality of criteria, and select one or more criteria based on a user's input using the UI. The source apparatus may receive information about the criteria from a server or the like external apparatus, and select one or more criteria based on the received information.

The foregoing operations may be implemented, for example, and without limitation, by a preset algorithm or artificial intelligence (AI).

In the foregoing embodiments, the transmission interface protocol may be the HDMI. However, the transmission interface protocol may include various wired/wireless protocols such as, for example, and without limitation, DP, Thunderbolt, etc., and the concept of the disclosure may be applied even when the transmission interface protocol is not the HDMI. For example, the DSC function may be applied even when the transmission interface protocol is the DP. When the transmission interface protocol is the DP, the source apparatus may select the image quality of the output image based on whether the DSC function is supported or not.

The operations of the apparatus described in the foregoing embodiments may, for example, be performed by artificial intelligence provided in the corresponding apparatus. The artificial intelligence may be applied to various general systems by utilizing a machine learning algorithm. An artificial intelligence system may refer, for example, to a computer system with intelligence of a human or being second to a human. In such a system, a machine, an apparatus or a system autonomously performs leaning and identifying and is improved in accuracy of recognition and identification based on accumulated experiences. The artificial intelligence may be based, for example, on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Linguistic comprehension may refer, for example, to technology of recognizing, applying and processing a human's language or text, and may include natural language processing, machine translation, conversation system, question and answer, voice recognition and synthesis, etc.

Inference and prediction may refer, for example, to technology of identifying information and logically making prediction, and may include knowledge- and probability-based inference, optimized prediction, preference-based plan, recommendation, etc.

Knowledge representation may refer, for example, to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although various example embodiments have been illustrated and described, it will be understood that the various example embodiments are intended to be illustrative, not limiting, and it will be appreciated by those skilled in the art that changes may be made in these embodiments without departing from the principles and spirit of the disclosure, the scope of which includes the appended claims and their equivalents.

What is claimed is:

1. An electronic apparatus comprising:
    a signal output circuit configured to connect with an external apparatus connected to a display apparatus,
    a processor configured to control the electronic apparatus to:
        obtain information about a first image format supported in the display apparatus from the external apparatus,
        output a content signal having the first image format to the external apparatus through the signal output circuit to the display apparatus based on identifying that the external apparatus supports an interface protocol capable of transmitting the content signal having the first image format, and
        output a content signal having a second image format different from the first image format to the external apparatus through the signal output circuit based on identifying that the external apparatus does not support the interface protocol,
        wherein the processor is further configured to identify whether the external apparatus supports the interface protocol based at least on a value of a register indicating that the external apparatus supports a predefined function, and
        wherein the processor is further configured to: perform link training regarding the predefined function at least by transmitting a training signal to the external apparatus, and access the register based on a response being normally received from the external apparatus.

2. The electronic apparatus according to claim 1, wherein the processor is configured to control the electronic apparatus to identify that the external apparatus does not support the interface protocol based on a predetermined signal line between the signal output circuit and the external apparatus being used in transmitting a clock signal and not transmitting data of a content signal, and
    identify that the external apparatus supports the interface protocol based on the signal line being used in transmitting the data.

3. The electronic apparatus according to claim 2, wherein the interface protocol is supported based on a connection using a high definition multimedia interface (HDMI) 2.1 and the HDMI between the signal output circuit and the external apparatus, wherein the interface protocol is not supported based on a connection using an HDMI older than HDMI 2.1.

4. The electronic apparatus according to claim 1, wherein the processor is configured to control the electronic apparatus to check a value stored in a preset register of the external apparatus to identify whether the interface protocol is supported.

5. The electronic apparatus according to claim 1, wherein the processor is configured to control the electronic apparatus to output the content signal having the first image format based on identifying that the external apparatus supports a mode of decompressing and processing image data compressed and transmitted in real time.

6. The electronic apparatus according to claim 1, wherein
    the information obtained from the external apparatus includes a plurality of blocks, and
    the processor is configured to control the electronic apparatus to output the content signal having the first image format based on identifying that the number of blocks, among the plurality of blocks, is greater than or equal to a threshold, wherein the number of blocks is not null.

7. The electronic apparatus according to claim 6, wherein
    the information comprises extended display identification data (EDID),
    the processor is configured to control the electronic apparatus to output the content signal having the first image format based on identifying that three or more blocks are present in the EDID, wherein the three or more blocks are not null.

8. The electronic apparatus according to claim 1, wherein the processor is configured to control the electronic apparatus to output the content signal having the first image format based on identifying that the external apparatus supports a power transfer mode to the external apparatus through the signal output circuit.

9. The electronic apparatus according to claim 1, wherein the processor is configured to control the electronic apparatus to: output the content signal having the first image format based on identifying that the external apparatus supports a mode of extracting an audio signal from the content signal received from the electronic apparatus and returning the extracted audio signal to the electronic apparatus.

10. The electronic apparatus according to claim 1, wherein the first image format corresponds to an 8K-class resolution, and the second image format corresponds to a resolution lower than the 8K-class resolution.

11. The electronic apparatus according to claim 1, wherein the signal output circuit is configured to output the content signal based on a high definition multimedia interface (HDMI) protocol.

12. A method of controlling an electronic apparatus, comprising:
    obtaining information about a first image format supported in a display apparatus from an external apparatus connected to the display apparatus;
    outputting a content signal having the first image format to the external apparatus to the display apparatus based on identifying that the external apparatus supports an interface protocol capable of transmitting the content signal having the first image format; and
    outputting a content signal having a second image format different from the first image format to the external apparatus based on identifying that the external apparatus does not support the interface protocol, the method further comprising identifying whether the external apparatus supports the interface protocol based at least on a value of a register indicating that the external apparatus supports a predefined function, and performing link training regarding the predefined function at least by transmitting a training signal to the external apparatus, and accessing the register based on a response being normally received from the external apparatus.

13. The method according to claim 12, further comprising: identifying that the external apparatus does not support the interface protocol based on a predetermined signal line between the electronic apparatus and the external apparatus being used in transmitting a clock signal and not data of a content signal, and identifying that the external apparatus supports the interface protocol based on the signal line being used in transmitting the data.

14. The method according to claim 13, further comprising: supporting the interface protocol based on a connection using a high definition multimedia interface (HDMI) 2.1 and HDMI between the electronic apparatus and the external apparatus, without supporting the interface protocol based on a connection using an HDMI older than the HDMI 2.1.

15. The method according to claim 12, further comprising: checking a value stored in a preset register of the external apparatus to identify whether the interface protocol is supported.

16. The method according to claim 12, further comprising: outputting the content signal having the first image format based on identifying that the external apparatus supports a mode of decompressing and processing image data compressed and transmitted in real time.

17. The method according to claim 12, wherein
the information obtained from the external apparatus includes a plurality of blocks, and
the method further comprises: outputting the content signal having the first image format based on identifying that the number of blocks, among the plurality of blocks, is greater than or equal to a threshold, wherein the number of blocks is not null.

18. The method according to claim 17, wherein
the information comprises extended display identification data (EDID), and
the method further comprises: outputting the content signal having the first image format based on identifying that three or more blocks are present in the EDID, wherein the three or more blocks are not null.

19. The method according to claim 12, further comprising outputting the content signal having the first image format based on identifying that the external apparatus supports a power transfer mode to the external apparatus through a signal output circuit.

20. The method according to claim 12, further comprising outputting the content signal having the first image format based on identifying that the external apparatus supports a mode of extracting an audio signal from the content signal received from the electronic apparatus and returning the extracted audio signal to the electronic apparatus.

* * * * *